US012693367B2

(12) United States Patent
Jiang

(10) Patent No.: US 12,693,367 B2
(45) Date of Patent: Jul. 28, 2026

(54) AOD ACQUISITION METHOD AND APPARATUS, AND COMMUNICATION DEVICE

(71) Applicant: Beijing Xiaomi Mobile Software Co., Ltd., Beijing (CN)

(72) Inventor: Xiaowei Jiang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 602 days.

(21) Appl. No.: 18/036,759

(22) PCT Filed: Nov. 13, 2020

(86) PCT No.: PCT/CN2020/128804
§ 371 (c)(1),
(2) Date: May 12, 2023

(87) PCT Pub. No.: WO2022/099645
PCT Pub. Date: May 19, 2022

(65) Prior Publication Data
US 2023/0408621 A1 Dec. 21, 2023

(51) Int. Cl.
G01S 3/48 (2006.01)
H04W 16/28 (2009.01)

(52) U.S. Cl.
CPC .............. G01S 3/48 (2013.01); H04W 16/28 (2013.01)

(58) Field of Classification Search
CPC . G01S 3/48; G01S 1/08; H04W 16/28; H04B 7/06
See application file for complete search history.

(56) References Cited

U.S. PATENT DOCUMENTS

| | | | |
|---|---|---|---|
| 2019/0387423 A1 | 12/2019 | Takahashi et al. | |
| 2020/0145977 A1 | 5/2020 | Kumar et al. | |
| 2021/0409970 A1* | 12/2021 | Zhu ...................... | H04B 7/0478 |
| 2023/0012726 A1* | 1/2023 | Karjalainen .......... | H04W 16/14 |

FOREIGN PATENT DOCUMENTS

| | | |
|---|---|---|
| CN | 108988921 A | 12/2018 |
| CN | 109687895 A | 4/2019 |
| CN | 110333478 A | 10/2019 |
| CN | 110998353 A | 4/2020 |
| CN | 111162827 A | 5/2020 |

(Continued)

OTHER PUBLICATIONS

Samsung."3GPP TSG RAN WG1 #89 R1-1709031" Composite Beam Transmission for SS blocks,May 19, 2017,entire document.

(Continued)

*Primary Examiner* — Eric Myers
(74) *Attorney, Agent, or Firm* — Volpe Koenig

(57) ABSTRACT

A method, computer readable medium, and apparatus for obtaining an angle of departure (AOD). The AOD is obtained by: transmitting a plurality of sweeping beams to a reception terminal; receiving at least one beam identifier, where the at least one beam identifier is determined according to signal quality of the plurality of sweeping beams; and determining a target sweeping beam on the basis of the at least one beam identifier, and determining an AOD of a transmission terminal on the basis of the target sweeping beam.

20 Claims, 13 Drawing Sheets

(56)                   References Cited

FOREIGN PATENT DOCUMENTS

| CN | 111201721 | A | 5/2020 |
| CN | 111698008 | A | 9/2020 |

OTHER PUBLICATIONS

Vivo, "Remaining issues on UE and gNB measurements for NR positioning", 3GPP TSG RAN WG1 #99, R1-1912046, Reno, USA, Nov. 18-22, 2019.

Huawei, HiSilicon,"Considerations on Angle-based positioning technique in NR", 3GPP TSG-RAN WG2 Meeting #105bis, R2-1904102, Xi'an, China, Apr. 8-12, 2019.

Intel Corporation, "[108#85] UE capability on NR positioning", 3GPP TSG-RAN WG2 Meeting #109 electronic, R2-2000475, Elbonia, Feb. 24-Mar. 6, 2020.

Wang et al., "A Distributive Localization Method for Wireless Sensor Networks Using Angle of Departure" (2010).

* cited by examiner

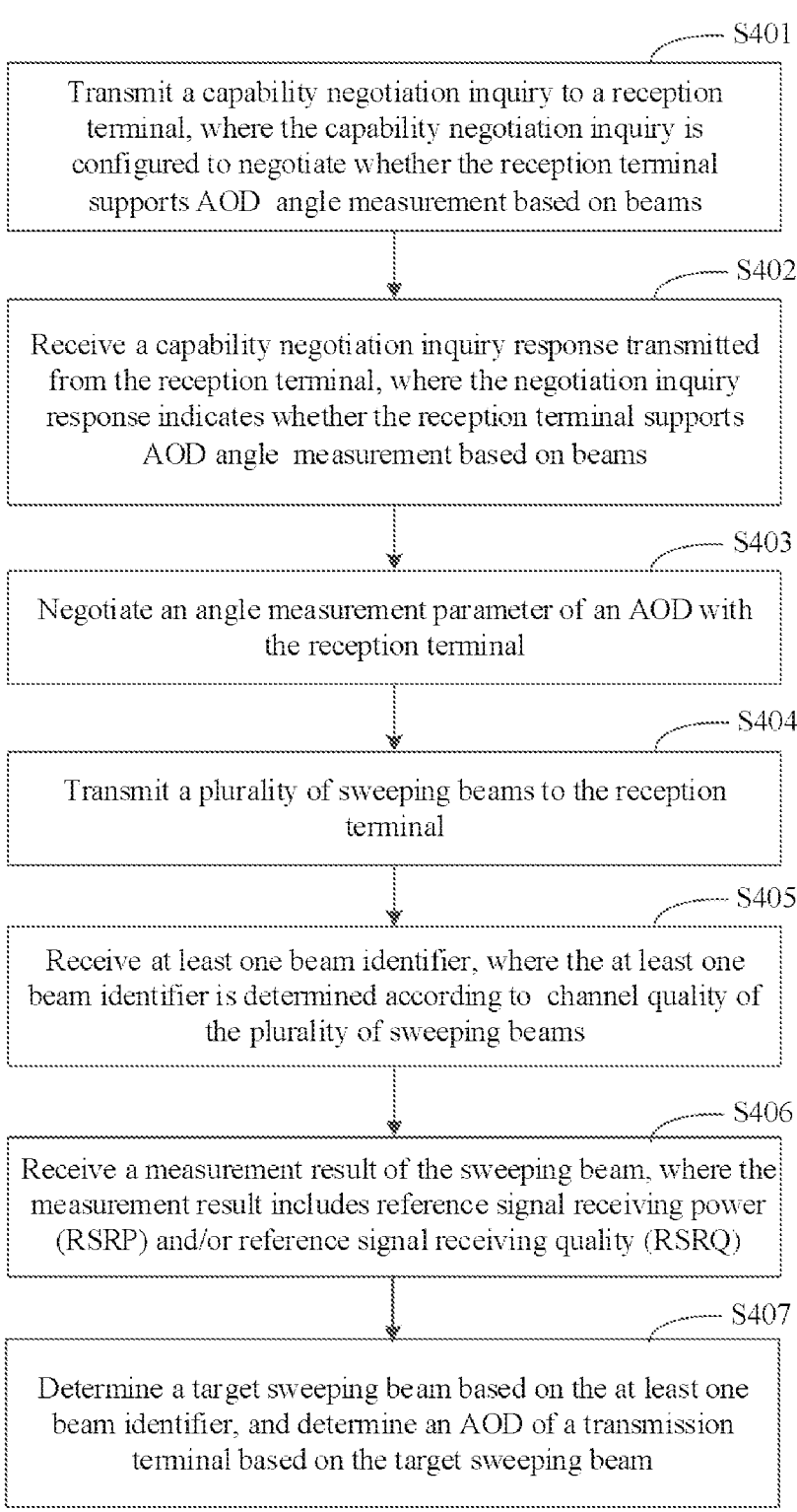

S401

Transmit a capability negotiation inquiry to a reception terminal, where the capability negotiation inquiry is configured to negotiate whether the reception terminal supports AOD angle measurement based on beams

S402

Receive a capability negotiation inquiry response transmitted from the reception terminal, where the negotiation inquiry response indicates whether the reception terminal supports AOD angle measurement based on beams

S403

Negotiate an angle measurement parameter of an AOD with the reception terminal

S404

Transmit a plurality of sweeping beams to the reception terminal

S405

Receive at least one beam identifier, where the at least one beam identifier is determined according to channel quality of the plurality of sweeping beams

S406

Receive a measurement result of the sweeping beam, where the measurement result includes reference signal receiving power (RSRP) and/or reference signal receiving quality (RSRQ)

S407

Determine a target sweeping beam based on the at least one beam identifier, and determine an AOD of a transmission terminal based on the target sweeping beam

Fig. 5

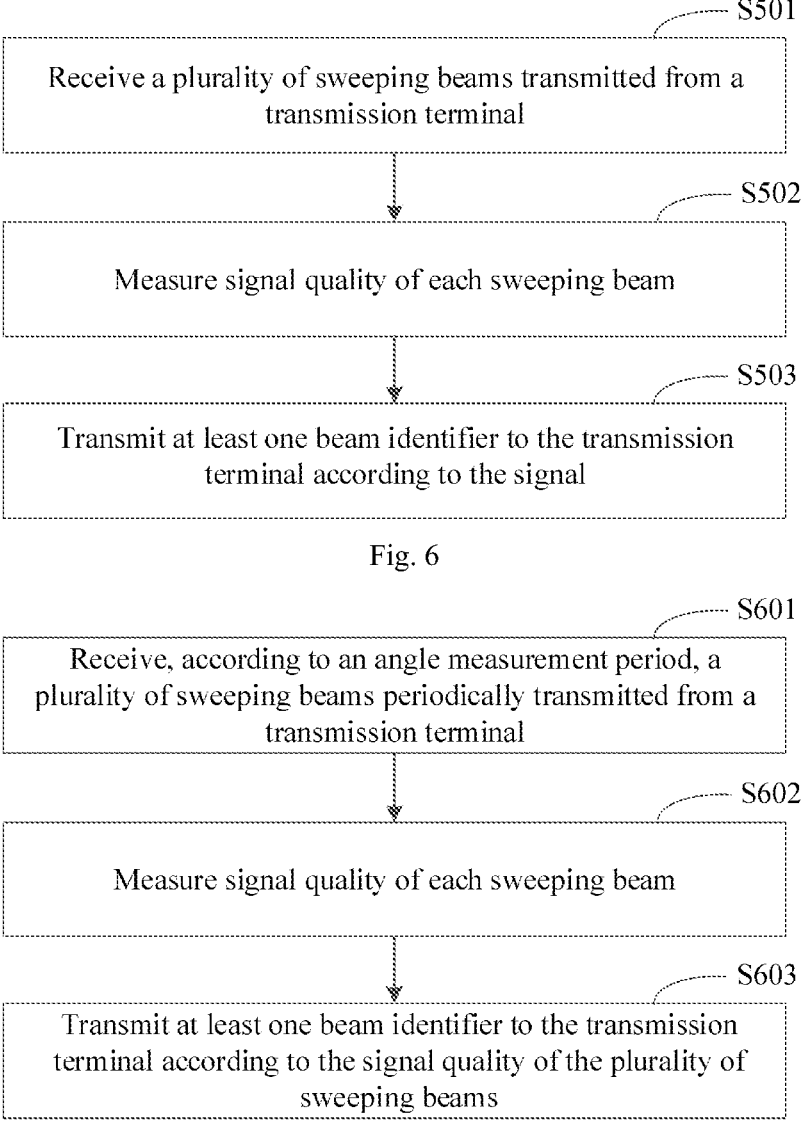

S501

Receive a plurality of sweeping beams transmitted from a transmission terminal

S502

Measure signal quality of each sweeping beam

S503

Transmit at least one beam identifier to the transmission terminal according to the signal

Receive, according to an angle measurement period, a plurality of sweeping beams periodically transmitted from a transmission terminal

S602

Measure signal quality of each sweeping beam

S603

Transmit at least one beam identifier to the transmission terminal according to the signal quality of the plurality of sweeping beams

Fig. 7

AOD ACQUISITION METHOD AND APPARATUS, AND COMMUNICATION DEVICE

CROSS REFERENCE TO RELATED APPLICATION

The present application is a U.S. National Stage of International Application No. PCT/CN2020/128804, filed on Nov. 13, 2020, the entire content of which is incorporated herein by reference for all purposes.

SUMMARY

An example of a first aspect of the disclosure provides a method for obtaining an angle of departure (AOD.) The method includes: transmitting a plurality of sweeping beams to a reception terminal; receiving at least one beam identifier, where the at least one beam identifier is determined according to signal quality of the plurality of sweeping beams; and determining a target sweeping beam on the basis of the at least one beam identifier, and determining an AOD of a transmission terminal on the basis of the target sweeping beam.

An example of a second aspect of the disclosure provides another method for obtaining an AOD. The method includes: receiving a plurality of sweeping beams transmitted from a transmission terminal; measuring signal quality of each sweeping beam; and transmitting at least one beam identifier to the transmission terminal according to the signal quality of the plurality of sweeping beams.

An example of a third aspect of the disclosure provides a communication device. The communication device includes: at least one processor; and a memory communicatively connected to the at least one processor, where the memory stores an instruction executable by the at least one processor, and the instruction enables the at least one processor to execute the method for obtaining an AOD according to the example of the first aspect of the disclosure or the method for obtaining an AOD according to the example of the second aspect of the disclosure when executed by the at least one processor.

An example of a fourth aspect of the disclosure provides a computer storage medium. The computer storage medium stores a computer executable instruction, where the computer executable instruction is capable of implementing the method for obtaining an AOD according to the example of the first aspect of the disclosure or the method for obtaining an AOD according to the example of the second aspect of the disclosure after being executed by a processor.

Additional aspects and advantages of the disclosure will be set forth partially in the following description, which will become obvious in the following description, or will be learned by practice of the disclosure.

BRIEF DESCRIPTION OF THE DRAWINGS

The aspects and/or additional aspects and advantages of the disclosure will become obvious and comprehensible from the description of examples in conjunction with the accompanying drawings below.

FIG. 5 is a schematic diagram of yet another method for obtaining an AOD according to an example of the disclosure;

FIG. 6 is a schematic diagram of yet another method for obtaining an AOD according to an example of the disclosure;

FIG. 7 is a schematic diagram of yet another method for obtaining an AOD according to an example of the disclosure;

DETAILED DESCRIPTION

Figure 1:
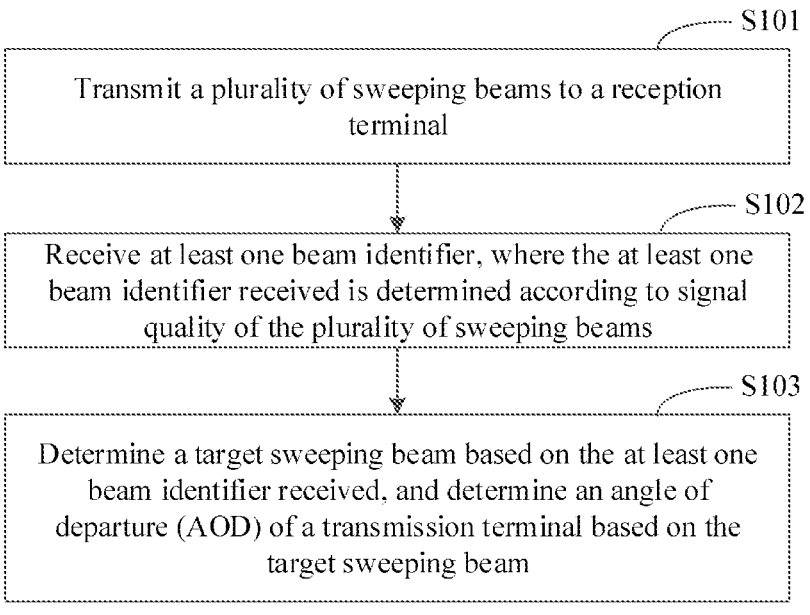
FIG. 1 is a schematic diagram of a method for obtaining an angle of departure (AOD) according to an example of the disclosure.

Examples will be described in detail here and shown in the accompanying drawings illustratively. When the following descriptions involve the accompanying drawings, unless otherwise specified, the same numeral in different accompanying drawings denotes the same or similar elements. The embodiments described in the following examples do not denote all embodiments consistent with the examples of the disclosure. On the contrary, the embodiments are merely examples of an apparatus and a method consistent with some aspects of the examples of the disclosure as detailed in the appended claims.

The terms used in the examples of the disclosure are merely to describe the specific examples, instead of limiting the examples of the disclosure. The terms "a," "an," and "the" of singular forms used in the examples and the appended claims of the disclosure are also intended to include plural forms, unless otherwise specified in the context clearly. It is to be further understood that the term "and/or" used here refers to and includes any of one or more of the associated listed items or all possible combinations.

It is to be understood that although the terms such as first, second and third may be used to describe various information in the examples of the disclosure, the information is not intended to be limited to the terms. The terms are merely used to distinguish the same type of information from each other. For example, without departing from the scope of the examples of the disclosure, first information can also be called second information, and similarly, second information can also be called first information. Depending on the context, the words "if" and "under the condition" as used here can be interpreted as "when," "at the time of," or "in response to determining."

The disclosure relates to the technical field of radio communication, and particularly relates to a method and apparatus for obtaining an AOD, a communication device, and a storage medium.

At present, in the field of ranging, a relative position of one of two devices relative to the other one is determined generally on the basis of a relative distance and relative angles between the two devices. The relative angles can include an angle of arrival (AOA) and an AOD. However, in the related art, the AOD cannot be obtained in long term evolution (LTE) networks and new radio (NR).

The disclosure provides a method and apparatus for obtaining an AOD, a communication device, and a storage medium, so as to solve a problem that in the related art, the AOD cannot be obtained in LTE networks and NR.

An example of a first aspect of the disclosure provides a method for obtaining an AOD. The method includes: transmitting a plurality of sweeping beams to a reception terminal; receiving at least one beam identifier, where the at least one beam identifier is determined according to the signal quality of the plurality of sweeping beams; and determining a target sweeping beam on the basis of the at least one beam identifier, and determining an AOD of a transmission terminal on the basis of the target sweeping beam.

An example of a second aspect of the disclosure provides another method for obtaining an AOD. The method includes: receiving a plurality of sweeping beams transmitted from a transmission terminal; measuring signal quality of each sweeping beam; and transmitting at least one beam identifier to the transmission terminal according to the signal quality of the plurality of sweeping beams.

An example of a third aspect of the disclosure provides an apparatus for obtaining an AOD. The apparatus includes: a beam transmission module configured to transmit a plurality of sweeping beams to a reception terminal; an identifier reception module configured to receive at least one beam identifier, where the at least one beam identifier is determined according to signal quality of the plurality of sweeping beams; and a determination module configured to determine a target sweeping beam on the basis of the at least one beam identifier, and determine an AOD of a transmission terminal on the basis of the target sweeping beam.

An example of a fourth aspect of the disclosure provides another apparatus for obtaining an AOD. The apparatus includes: a beam reception module configured to receive a plurality of sweeping beams transmitted from a transmission terminal; a quality measurement module configured to measure signal quality of each sweeping beam; and an identifier transmission module configured to transmit at least one beam identifier to the transmission terminal according to the signal quality of the plurality of sweeping beams.

An example of a fifth aspect of the disclosure provides a communication device. The communication device includes: at least one processor; and a memory communicatively connected to the at least one processor, where the memory stores an instruction executable by the at least one processor, and the instruction enables the at least one processor to execute the method for obtaining an AOD according to the example of the first aspect of the disclosure or the method for obtaining an AOD according to the example of the second aspect of the disclosure when executed by the at least one processor.

An example of a sixth aspect of the disclosure provides a computer storage medium. The computer storage medium stores a computer executable instruction, where the computer executable instruction is capable of implementing the method for obtaining an AOD according to the example of the first aspect of the disclosure or the method for obtaining an AOD according to the example of the second aspect of the disclosure after being executed by a processor.

The examples provided by the disclosure at least have the following beneficial technical effects:

according to the method for obtaining an AOD of the examples of the disclosure, the transmission terminal may transmit the plurality of sweeping beams to the reception terminal; then the at least one beam identifier is received, where the at least one beam identifier is determined according to the signal quality of the plurality of sweeping beams; and then the target sweeping beam is determined on the basis of the at least one beam identifier, and the AOD of the transmission terminal is determined on the basis of the target sweeping beam. In this way, the transmission terminal may transmit the sweeping beams to the reception terminal, and the AOD of the transmission terminal may be determined according to the beam identifier, such that the AOD may be obtained in LTE networks and NR.

Additional aspects and advantages of the disclosure will be set forth partially in the following description, which will become obvious in the following description, or will be learned by practice of the disclosure.

The examples of the disclosure are described in detail below, and the examples are illustratively shown in accompanying drawings, throughout which identical or similar reference numerals denote identical or similar elements. The examples described with reference to the accompanying drawings are illustrative and intended to explain the disclosure, instead of being construed as limiting the disclosure.

A method and apparatus for obtaining an AOD, a communication device and a storage medium according to the disclosure will be described in detail below with reference to the accompanying drawings.

FIG. 1 is a schematic diagram of a method for obtaining an AOD according to an example of the disclosure.

As shown in FIG. 1, the method for obtaining an AOD according to the example of the disclosure includes the following steps:

S101, a plurality of sweeping beams are transmitted to a reception terminal.

It is to be noted that an execution subject of the method for obtaining an AOD according to the examples of the disclosure, is a transmission terminal. The transmission terminal includes, but is not limited to, a mobile phone, a computer, a smart wearable device, a smart home appliance, a vehicle-mounted terminal, etc., which are not limited here.

In the example of the disclosure, the transmission terminal may transmit the plurality of sweeping beams to the reception terminal. Alternatively, the transmission terminal is provided with an antenna array, and the transmission terminal may transmit the plurality of sweeping beams to the reception terminal by means of its own antenna array.

Figure 2:
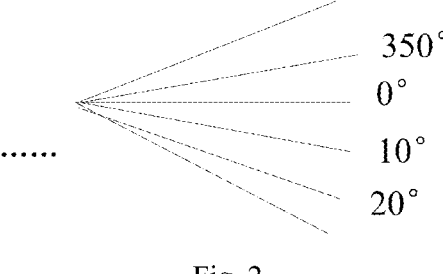
FIG. 2 is a schematic diagram of a plurality of sweeping beams in a method for obtaining an AOD according to an example of the disclosure.

Alternatively, the transmission terminal may transmit the plurality of sweeping beams having different beam azimuth angles to the reception terminal. For example, as shown in FIG. 2, the transmission terminal may transmit sweeping beams having beam azimuth angles of 0°, 10°, and 20°-350°.

A difference between the beam azimuth angles of two adjacent sweeping beams is 10°.

S102, at least one beam identifier is received, where the at least one beam identifier received is determined according to signal quality of the plurality of sweeping beams.

In the example of the disclosure, after the transmission terminal transmits the plurality of sweeping beams to the reception terminal, the at least one beam identifier is received. The at least one beam identifier is determined according to the signal quality of the plurality of sweeping beams.

It may be understood that each sweeping beam may correspond to abeam identifier, and different sweeping identifiers are configured to distinguish different sweeping beams. The beam identifiers may be in the form of numbers, characters, etc., which are not limited here.

In the example of the disclosure, the beam identifier of each sweeping beam is determined according to a corresponding transmission position of the sweeping beam. The transmission position of the sweeping beam may include a beam azimuth angle of the sweeping beam. Further, with FIG. 2 as an example, the beam identifier of each sweeping beam may be determined according to the corresponding beam azimuth angle of the sweeping beam. The beam identifier of the sweeping beam having the beam azimuth angle of 0° may be #0.The beam identifier of the sweeping beam having the beam azimuth angle of 10° may be #1.The beam identifier of the sweeping beam having the beam azimuth angle of 20° may be #2.By analogy, the beam identifier of the sweeping beam having the beam azimuth angle of 350° may be #35.

In the example of the disclosure, each sweeping beam carries its own beam identifier. In this case, the reception terminal may extract the corresponding beam identifier from each sweeping beam.

It may be understood that different sweeping beams may correspond to different signal quality. In the example of the disclosure, the at least one beam identifier received by the transmission terminal is selected according to the signal quality of the plurality of sweeping beams. For example, the at least one beam identifier may be a beam identifier, corresponding to at least one sweeping beam, selected in descending order of the signal quality of the plurality of sweeping beams. Assuming that the transmission terminal transmits 10 sweeping beams to the reception terminal, a beam identifier of the sweeping beam (that is, the sweeping beam having optimal signal quality) ranking 1 may be selected in descending order of signal quality of the 10 sweeping beams. In this case, the number of the at least one beam identifier received by the transmission terminal is one, and the beam identifier is the beam identifier of the sweeping beam having optimal signal quality among the 10 sweeping beams. Alternatively, beam identifiers of the sweeping beams ranking 1-3 may be selected. In this case, the number of the at least one beam identifier received by the transmission terminal is 3, and the beam identifiers are the beam identifiers of the sweeping beams having the signal quality ranking 1-3 in the 10 sweeping beams. In this way, the method may obtain the beam identifier of at least one sweeping beam having high signal quality from the plurality of sweeping beams.

In the example of the disclosure, the transmission terminal transmits the plurality of sweeping beams to the reception terminal, then the reception terminal may select at least one beam identifier corresponding to at least one sweeping beam according to the signal quality of the plurality of sweeping beams, and the at least one beam identifier may be transmitted to the transmission terminal. Further, the transmission terminal may receive the at least one beam identifier transmitted from the reception terminal.

S103, a target sweeping beam is determined on the basis of the at least one beam identifier received, and the AOD of the transmission terminal is determined on the basis of the target sweeping beam.

In the example of the disclosure, after the transmission terminal receives the at least one beam identifier, the target sweeping beam may be determined on the basis of the beam identifier.

It may be understood that under the condition that the beam identifier received is unique, the beam identifier is the beam identifier of the sweeping beam having the optimal signal quality in the plurality of sweeping beams, and the target sweeping beam may be determined directly according to a one-to-one correspondence between the beam identifiers and the sweeping beams.

In the example of the disclosure, the target sweeping beam is determined on the basis of the unique beam identifier as follows: a mapping relation or a mapping table between the beam identifiers and the sweeping beams is established in advance, and the sweeping beam corresponding to the beam identifier is determined as the target sweeping beam by looking up the mapping relation or the mapping table after the beam identifier is obtained. It is to be noted that the mapping relation or mapping table may be set according to an actual condition and set in the storage space of the transmission terminal.

It may be understood that the sweeping beams are likely to fluctuate due to interference factors such as an environment. Under the condition that only the unique beam identifier is received and the target sweeping beam is determined on the basis of the unique beam identifier, the target sweeping beam selected may be inaccurate and unstable. In order to solve the above problems, the transmission terminal may further receive a plurality of beam identifiers, then signal quality, measured multiple times, of a plurality of candidate sweeping beams identified by the plurality of beam identifiers is obtained, and the candidate sweeping beam having optimal signal quality is selected as the target sweeping beam according to the signal quality measured multiple times. It may be understood that the stability of the signal quality is also an influencing factor of the signal quality. For example, a variance of the signal quality, measured multiple times, of each candidate sweeping beam may be obtained, and the candidate sweeping beam having a minimum variance may be selected as the target sweeping beam.

In this way, the method may effectively avoid an inaccurate target sweeping beam selected when the sweeping beams are disturbed to fluctuate, and the target sweeping beam selected is stable accordingly.

Further, after the transmission terminal determines the target sweeping beam on the basis of the at least one beam identifier, the angle of departure (AOD) of the transmission terminal may be determined on the basis of the target sweeping beam.

Further, with FIG. 2 as an example, the beam identifier of the sweeping beam having the beam azimuth angle of 0° may be #0. The beam identifier of the sweeping beam having the beam azimuth angle of 10° may be #1. The beam identifier of the sweeping beam having the beam azimuth angle of 20° may be #2. By analogy, the beam identifier of the sweeping beam having the beam azimuth angle of 350° may be #35.

Under the condition that the beam identifier received by the transmission terminal is #1, it may be determined that the target sweeping beam is the sweeping beam having the beam azimuth angle of 10° on the basis of the beam identifier #1 and the AOD of the transmission terminal is 10°.

Alternatively, under the condition that the beam identifiers received by the transmission terminal are #7, #18, and #9, signal quality, measured multiple times, of candidate sweeping beams identified by the beam identifiers #7, #18 and #9 may be obtained, and the candidate sweeping beam having optimal signal quality is selected as the target sweeping beam according to the signal quality measured multiple times. Under the condition that it is determined that the candidate sweeping beam identified by the beam identifier #7 has the optimal signal quality according to the signal quality measured multiple times, the candidate sweeping beam identified by the beam identifier #7 may be regarded as the target sweeping beam, and the AOD of the transmission terminal may be determined as 70°.

It may be understood that the method for obtaining an AOD according to the example of the disclosure may determine the AOD of the transmission terminal, and may be applied to the field of angle measurement. In the example of the disclosure, after the AOD of the transmission terminal is determined, the transmission terminal may further determine a relative position of the reception terminal relative to the transmission terminal according to the AOD of the transmission terminal and a distance between the transmission terminal and the reception terminal. In this way, the method for obtaining an AOD according to the example of the disclosure may be further applied to the field of positioning.

According to the method for obtaining an AOD of the examples of the disclosure, the transmission terminal may transmit the plurality of sweeping beams to the reception terminal; then the beam identifier is received, where the beam identifier is determined according to the signal quality of the plurality of sweeping beams; and then the target sweeping beam is determined on the basis of the at least one beam identifier, and the AOD of the transmission terminal is determined on the basis of target sweeping beam. In this way, the transmission terminal may transmit the sweeping beams to the reception terminal, and the AOD of the transmission terminal may be determined according to the beam identifier, such that the AOD may be obtained in LTE networks and NR.

Figure 3:
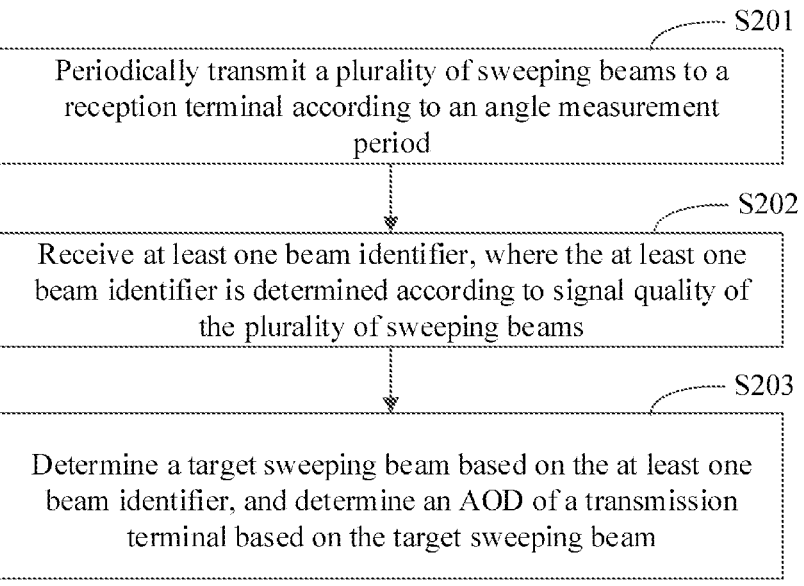
FIG. 3 is a schematic diagram of another method for obtaining an AOD according to an example of the disclosure.

FIG. 3 is a schematic diagram of another method for obtaining an AOD according to an example of the disclosure.

As shown in FIG. 3, the method for obtaining an AOD according to the example of the disclosure includes the following steps:

S201, a plurality of sweeping beams are periodically transmitted to a reception terminal according to an angle measurement period.

It may be understood that an AOD of a transmission terminal is likely to change because the positions of the transmission terminal and the reception terminal are likely to change. In the example of the disclosure, under the condition that the transmission terminal may periodically transmit the plurality of sweeping beams to the reception terminal according to the angle measurement period, the AOD of the transmission terminal may be re-determined at fixed intervals of angle measuring periods, such that the AOD of the transmission terminal may be updated in time.

The angle measurement period may be set according to an actual condition, and may be set as 10 min, for example.

For example, under the condition that the angle measurement period is 10 min, the transmission terminal may transmit the plurality of sweeping beams to the reception terminal in each angle measurement period, and an interval between two adjacent times of transmission is 10 min.

S202, at least one beam identifier is received, where the at least one beam identifier is determined according to signal quality of the plurality of sweeping beams.

S203, a target sweeping beam is determined on the basis of the at least one beam identifier, and the AOD of the transmission terminal is determined on the basis of target sweeping beam.

Reference may be made to the above examples for the related contents of S202-S203, which will not be repeated here.

According to the method for obtaining an AOD of the example of the disclosure, the transmission terminal may periodically transmit the plurality of sweeping beams to the reception terminal according to the angle measurement period; then the at least one beam identifier is received, where the at least one beam identifier is determined according to the signal quality of the plurality of sweeping beams; and then the target sweeping beam is determined on the basis of a unique beam identifier obtained through the at least one beam identifier, and the AOD of the transmission terminal is determined on the basis of the target sweeping beam. In this way, under the condition that the transmission terminal may periodically transmit the plurality of sweeping beams to the reception terminal according to the angle measurement period, the AOD of the transmission terminal may be re-determined at fixed intervals of angle measuring periods, such that the AOD of the transmission terminal may be updated in time.

Figure 4:
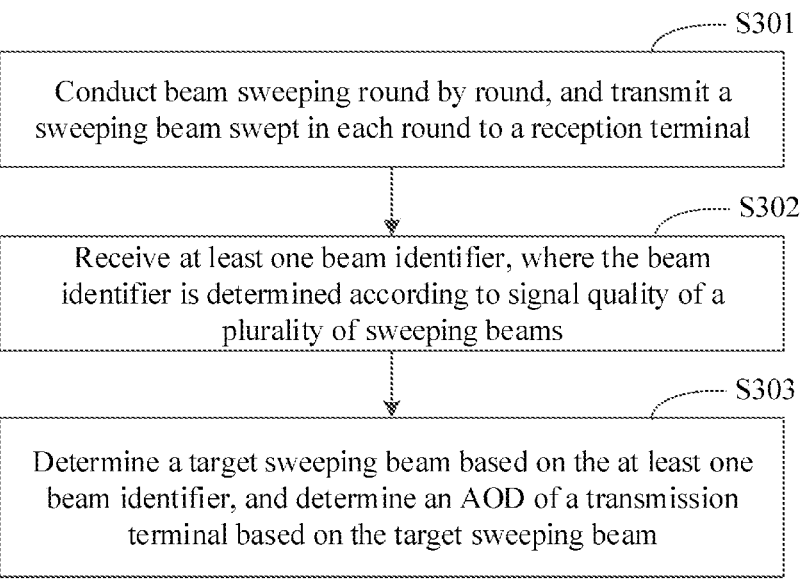
FIG. 4 is a schematic diagram of yet another method for obtaining an AOD according to an example of the disclosure.

FIG. 4 is a schematic diagram of yet another method for obtaining an AOD according to an example of the disclosure.

As shown in FIG. 4, the method for obtaining an AOD according to the example of the disclosure includes the following steps:

S301, beam sweeping is conducted round by round, and a sweeping beam swept in each round is transmitted to a reception terminal.

It may be understood that an AOD of a transmission terminal is likely to change because the positions of the transmission terminal and the reception terminal are likely to change. In the example of the disclosure, under the condition that the transmission terminal may conduct beam sweeping round by round and the sweeping beam swept in each round may be transmitted to the reception terminal, the AOD of the transmission terminal may be re-determined in each round of sweeping, such that the AOD of the transmission terminal may be updated in time.

Beam sweeping may be conducted round by round according to two possible embodiments as follows:

In aspects of Embodiment 1, beam sweeping is conducted according to the number of sweeping rounds negotiated with the reception terminal.

In the example of the disclosure, the transmission terminal may negotiate the number of sweeping rounds with the reception terminal in advance, and beam sweeping is conducted according to the number of sweeping rounds negotiated with the reception terminal.

The number of sweeping rounds may be negotiated and set according to an actual condition, and may be set as 10 rounds, for example.

For example, under the condition that the number of sweeping rounds is 10 rounds, the transmission terminal may transmit the plurality of sweeping beams to the reception terminal in each round of sweeping, and the number of sweeping rounds is 10 rounds in total.

In aspects of Embodiment 2, indication information is transmitted to the reception terminal after each time sweeping is completed or the beam identifier is received, where the indication information is configured to indicate whether a sweeping beam in a next round is present.

In the example of the disclosure, the transmission terminal may transmit the indication information to the reception terminal after each time sweeping is completed or the beam identifier is received. The indication information is configured to indicate whether the sweeping beam in the next round is present. In this way, the reception terminal may receive the sweeping beam according to the indication information.

In the example of the disclosure, the indication information further includes start time of a next round of sweeping, such that the reception terminal may receive the sweeping beam according to the start time of the next round of sweeping.

It may be understood that under the condition that the beam identifier may be a beam identifier corresponding to a sweeping beam having optimal signal quality in the sweeping beams swept in each round, the beam identifier may be re-determined in each round of sweeping, such that the AOD of the transmission terminal may be updated in time.

In this case, beam sweeping may be conducted round by round as follows: a first beam azimuth angle of the sweeping beam in the next round is determined according to the beam identifier received in a last round and a current round number, and the next round of beam sweeping is conducted according to the first beam azimuth angle.

It may be understood that under the condition that the beam identifier is the beam identifier corresponding to the sweeping beam having the optimal signal quality in the sweeping beams swept in each round, the beam identifier transmitted from the reception terminal in the last round is a beam identifier corresponding to a sweeping beam having optimal signal quality in sweeping beams swept in the last round. In this case, the first beam azimuth angle of the sweeping beam in the next round may be determined according to the beam identifier received in the last round and the current round number, and the next round of beam sweeping may be conducted according to the first beam azimuth angle. In this way, the number of times of beam sweeping is reduced while angle measurement accuracy is ensured.

For example, further with FIG. 2 as an example, under the condition that the beam identifier transmitted from the reception terminal in the last round is #1 and the current round number is 1, the first beam azimuth angle of the sweeping beam in the next round may be a beam azimuth angle 10° corresponding to the sweeping beam identified by the beam identifier #1, and then the next round of beam sweeping may be conducted according to the first beam azimuth angle 10°.

For instance, where, the first beam azimuth angle of the sweeping beam in the next round may be determined according to the beam identifier received in the last round and the current round number, and include a second beam azimuth angle of the sweeping beam is determined according to the sweeping beam identified by the beam identifier and the current round number, and then the second beam azimuth angle is divided according to the number of beams to be swept in each round, and the first beam azimuth angle of the next round is determined. The number of beams to be swept in each round may be set according to an actual condition, and may be set as 10, for example.

For example, further with FIG. 2 as an example, under the condition that the number of beams to be swept in each round is 36, the beam identifier transmitted from the reception terminal in the last round is #1, and the current round number is 1, it may be determined that the second beam azimuth angle of the sweeping beam is 10°, the second beam azimuth angle 10° may be divided, and the first beam azimuth angles in the next round are determined as 5/18°, 5/9°, 5/6°-10° in order. Further, the next round of beam sweeping may be conducted according to the first beam azimuth angles 5/18°, 5/9°, 5/6°-10°. In this case, the method may achieve angle measurement accuracy of sweeping 36*36 beams by sweeping only 72 beams, such that the number of times of beam sweeping is greatly reduced.

In this way, when beam sweeping is conducted round by round, coarse-grained beam sweeping may be conducted according to the number of beams to be swept in each round, then the first beam azimuth angle of the sweeping beam in the next round may be determined according to the sweeping beam identified by the beam identifier and the current round number, and the next round of beam sweeping may be conducted according to the first beam azimuth angle, that is, fine-grained beam sweeping may be conducted. In this way, the number of times of beam sweeping is reduced while angle measurement accuracy is ensured.

S302, at least one beam identifier is received, where the beam identifier is determined according to signal quality of a plurality of sweeping beams.

S303, a target sweeping beam is determined on the basis of the at least one beam identifier, and the AOD of the transmission terminal is determined on the basis of target sweeping beam.

Reference may be made to the above examples for the related contents of S302-S303, which will not be repeated here.

According to the method for obtaining an AOD of the example of the disclosure, the transmission terminal conducts beam sweeping round by round, the sweeping beam swept in each round is transmitted to the reception terminal, then the at least one beam identifier is received, where the at least one beam identifier is determined according to the signal quality of the plurality of sweeping beams, and then the target sweeping beam is determined on the basis of the unique beam identifier obtained through the at least one beam identifier, and the AOD of the transmission terminal is determined on the basis of the target sweeping beam. In this way, under the condition that the transmission terminal may conduct beam sweeping round by round and the sweeping beam swept in each round may be transmitted to the reception terminal, the AOD of the transmission terminal may be re-determined in each round of sweeping, such that the AOD of the transmission terminal may be updated in time.

FIG. 5 is a schematic diagram of yet another method for obtaining an AOD according to an example of the disclosure.

As shown in FIG. 5, the method for obtaining an AOD according to the example of the disclosure includes the following steps:

S401, a capability negotiation inquiry is transmitted to a reception terminal, where the capability negotiation inquiry is configured to negotiate whether the reception terminal supports AOD angle measurement based on beams.

In the example of the disclosure, before a transmission terminal transmits a plurality of sweeping beams to the reception terminal, the capability negotiation inquiry may be transmitted to the reception terminal, where the capability negotiation inquiry is configured to negotiate whether the reception terminal supports AOD angle measurement based on beams.

S402, a capability negotiation inquiry response transmitted from the reception terminal is received, where the negotiation inquiry response indicates the reception terminal supports AOD angle measurement based on beams.

In the example of the disclosure, the transmission terminal may receive the capability negotiation inquiry response transmitted from the reception terminal, where the negotiation inquiry response indicates the reception terminal supports AOD angle measurement based on beams, which indicates that the method for obtaining an AOD according to the example of the disclosure may be applied to the reception terminal and the following steps S403-S407 may be continued.

As another possible embodiment, the negotiation inquiry response indicates the reception terminal does not support AOD angle measurement based on beams, which indicates that the method for obtaining an AOD according to the example of the disclosure cannot be applied to the reception terminal and the following steps S403-S407 do not need to be continued.

In the example of the disclosure, the capability negotiation inquiry may be transmitted or the capability negotiation inquiry response may be received through a user equipment capability inquiry sidelink or a user equipment capability information sidelink.

S403, an angle measurement parameter of the AOD is negotiated with the reception terminal.

In the example of the disclosure, before transmission terminal transmits the plurality of sweeping beams to the reception terminal, the angle measurement parameter of the AOD may be negotiated with the reception terminal. It may be understood that the angle measurement parameter is configured to instruct the transmission terminal to transmit the plurality of sweeping beams to the reception terminal.

In the example of the disclosure, the angle measurement parameter includes one or more of the following parameters: the number of the sweeping beams transmitted, a sweeping interval, the number of the beam identifiers fed back, the number of sweeping rounds, a sweeping interval of each round, the number of the sweeping beams swept in each round, time frequency resource information used by the sweeping beams, and the angle measurement period for triggering angle measurement.

The sweeping interval may include a time interval between the adjacent sweeping beams transmitted, the sweeping interval of each round may include a time interval between two adjacent rounds of sweeping beams transmitted, and the time frequency resource information used by the sweeping beams may include a resource pool used by the sweeping beams, starting time of the sweeping beam, etc.

In the example of the disclosure, the angle measurement parameter of the AOD may be negotiated with the reception terminal in one of the following ways:

Way 1, an angle measurement inquiry is transmitted to the reception terminal, where the angle measurement inquiry carries the angle measurement parameter.

Way 2, an angle measurement inquiry response transmitted from the reception terminal is received, where the angle measurement inquiry response carries the angle measurement parameter.

In the example of the disclosure, the above angle measurement inquiry or angle measurement inquiry response may be transmitted through a radio resource control (RRC) message corresponding to a link interface (PC5) between terminals (PC5-RRC for short) and a signaling protocol message corresponding to the link interface (PC5) between the terminals (PC5-S for short).

Way 3, resource scheduling information is transmitted to the reception terminal, where the resource scheduling information includes the angle measurement parameter.

In the example of the disclosure, a resource pool is configured for the transmission terminal in advance, and the transmission terminal may schedule resources from the resource pool according to a certain resource scheduling rule. In order to ensure information transmission with the reception terminal, the corresponding resource scheduling information may be transmitted to the reception terminal.

Way 4, negotiation indication information is transmitted to the reception terminal, where the negotiation indication information carries the angle measurement parameter.

In the example of the disclosure, the angle measurement inquiry, the angle measurement inquiry response, the resource scheduling information and the negotiation indication information in the above four ways may be transmitted through radio resource control (RRC) signaling or other signaling.

S404, the plurality of sweeping beams are transmitted to the reception terminal.

S405, at least one beam identifier is received, where the at least one beam identifier is determined according to signal quality of the plurality of sweeping beams.

Reference may be made to the above examples for the related contents of S404-S405, which will not be repeated here.

S406, a measurement result of the sweeping beam is received, where the measurement result includes reference signal receiving power (RSRP) and/or reference signal receiving quality (RSRQ).

In the example of the disclosure, after the transmission terminal transmits the plurality of sweeping beams to the reception terminal, the measurement results of the sweeping beams may be further received. The measurement result includes the reference signal receiving power (RSRP) and/or the reference signal receiving quality (RSRQ).

In the example of the disclosure, after the transmission terminal transmits the plurality of sweeping beams to the reception terminal, the reception terminal may obtain the measurement results of the plurality of sweeping beams, and the measurement results of the plurality of sweeping beams may be fed back to the transmission terminal. Further, the transmission terminal may receive the measurement results of sweeping beams, transmitted from the reception terminal.

S407, a target sweeping beam is determined on the basis of the at least one beam identifier, and the AOD of the transmission terminal is determined on the basis of target sweeping beam.

Reference may be made to the above examples for the related content of S407, which will not be repeated here.

According to the method for obtaining an AOD of the example of the disclosure, the transmission terminal transmits the capability negotiation inquiry to the reception terminal, and the capability negotiation inquiry response transmitted from the reception terminal may be received, where the negotiation inquiry response indicates the reception terminal supports AOD angle measurement based on beams, then the transmission terminal transmits the plurality of sweeping beams to the reception terminal, then the at least one beam identifier transmitted from the reception terminal is received, where the at least one beam identifier is determined according to the signal quality of the plurality of sweeping beams, further, the measurement result of the sweeping beam may be received, then a beam direction of the target sweeping beam identified by the unique beam identifier obtained through the at least one beam identifier may be determined, and the AOD of the transmission terminal is determined on the basis of the beam direction of the target sweeping beam. In this way, the transmission terminal may transmit the sweeping beams to the reception terminal, and the AOD of the transmission terminal may be determined according to the beam identifier.

FIG. 6 is a schematic diagram of yet another method for obtaining an AOD according to an example of the disclosure.

As shown in FIG. 6, the method for obtaining an AOD according to the example of the disclosure includes the following steps:

S501, a plurality of sweeping beams transmitted from a transmission terminal are received.

It is to be noted that an execution subject of the method for obtaining an AOD according to the examples of the disclosure is a reception terminal. The reception terminal includes, but is not limited to, a mobile phone, a computer, a smart wearable device, a smart home appliance, a vehicle-mounted terminal, etc., which are not limited here.

In the example of the disclosure, the reception terminal may receive the plurality of sweeping beams transmitted from the transmission terminal. Alternatively, the reception terminal is provided with an antenna array, and the reception terminal may receive the plurality of sweeping beams transmitted from the transmission terminal by means of its own antenna array.

S502, signal quality of each sweeping beam is measured.

In the example of the disclosure, after the reception terminal receives the plurality of sweeping beams transmitted from the transmission terminal, the signal quality of each sweeping beam may be measured.

In the example of the disclosure, the signal quality of each sweeping beam may be measured as follows: reference signal receiving power (RSRP) and/or the reference signal receiving quality (RSRQ) of each sweeping beam are/is measured.

S503, at least one beam identifier is transmitted to the transmission terminal according to the signal quality of the plurality of sweeping beams.

In the example of the disclosure, the reception terminal may determine at least one sweeping beam from the plurality of sweeping beams according to the signal quality of the plurality of sweeping beams, and further the beam identifier of the at least one sweeping beam may be transmitted to the transmission terminal.

It may be understood that each sweeping beam may correspond to a beam identifier, which is configured to distinguish different sweeping beams. The beam identifiers may be in the form of numbers, characters, etc., which are not limited here.

In the example of the disclosure, the reception terminal may determine the beam identifier of the sweeping beam according to a transmission position of the sweeping beam. The transmission position of the sweeping beam may include a beam azimuth angle of the sweeping beam. Further with FIG. 2 as an example, a beam identifier of a sweeping beam having a beam azimuth angle of 0° may be #0. A beam identifier of a sweeping beam having a beam azimuth angle of 10° may be #1. A beam identifier of a sweeping beam having a beam azimuth angle of 20° may be #2. By analogy a beam identifier of a sweeping beam having a beam azimuth angle of 350° may be #35.

In the example of the disclosure, each sweeping beam carries its own beam identifier. In this case, the reception terminal may extract the beam identifier of the sweeping beam from the sweeping beam.

It may be understood that different sweeping beams may correspond to different signal quality. Alternatively, the at least one beam identifier is selected according to the signal quality of the plurality of sweeping beams. For example, the at least one beam identifier may be a beam identifier, corresponding to at least one sweeping beam, selected in descending order of the signal quality of the plurality of sweeping beams. Assuming that the transmission terminal transmits 10 sweeping beams to the reception terminal, a beam identifier of the sweeping beam (that is, the sweeping beam having optimal signal quality) ranking 1 may be selected in descending order of signal quality of the 10 sweeping beams. In this case, the number of the at least one beam identifier received by the transmission terminal is one, and the beam identifier is the beam identifier of the sweeping beam having optimal signal quality in the 10 sweeping beams. Alternatively, beam identifiers of the sweeping beams ranking 1-3 may be selected. In this case, the number of the at least one beam identifier received by the transmission terminal is 3, and the beam identifiers are the beam identifiers of the sweeping beams having the signal quality ranking 1-3 in the 10 sweeping beams. In this way, the method may obtain the beam identifier of at least one sweeping beam having high signal quality from the plurality of sweeping beams.

According to the method for obtaining an AOD of the example of the disclosure, the reception terminal may receive the plurality of sweeping beams transmitted from the transmission terminal, the signal quality of each sweeping beam may be measured, and then the at least one beam identifier may be transmitted to the transmission terminal according to the signal quality of the plurality of sweeping beams. In this way, the reception terminal may transmit the at least one beam identifier to the transmission terminal, such that the transmission terminal may determine the AOD of the transmission terminal according to the beam identifier.

FIG. 7 is a schematic diagram of yet another method for obtaining an AOD according to an example of the disclosure.

As shown in FIG. 7, the method for obtaining an AOD according to the example of the disclosure includes the following steps:

S601, according to an angle measurement period, a plurality of sweeping beams periodically transmitted from a transmission terminal are received.

It may be understood that an AOD of the transmission terminal is likely to change because positions of the transmission terminal and a reception terminal are likely to change. In the example of the disclosure, under the condition that the reception terminal may receive the plurality of sweeping beams periodically transmitted from the transmission terminal according to the angle measurement period, the beam identifiers may be re-determined at fixed intervals of angle measuring periods, such that the transmission terminal may update the AOD of the transmission terminal in time according to the beam identifiers re-determined.

S602, signal quality of each sweeping beam is measured.

S603, at least one beam identifier is transmitted to the transmission terminal according to the signal quality of the plurality of sweeping beams.

Reference may be made to the above examples for the related contents of S602-S603, which will not be repeated here.

According to the method for obtaining an AOD of the example of the disclosure, the reception terminal may receive the plurality of sweeping beams periodically transmitted from the transmission terminal according to the angle measurement period, the signal quality of each sweeping beam may be measured, and then the at least one beam identifier may be transmitted to the transmission terminal according to the signal quality of the plurality of sweeping beams. In this way, under the condition that the reception terminal may receive the plurality of sweeping beams periodically transmitted from the transmission terminal according to the angle measurement period, the beam identifiers may be re-determined at fixed intervals of angle measuring periods, such that the transmission terminal may update the AOD of the transmission terminal according to the beam identifiers re-determined, and the AOD of the transmission terminal may be updated in time.

Figure 8:
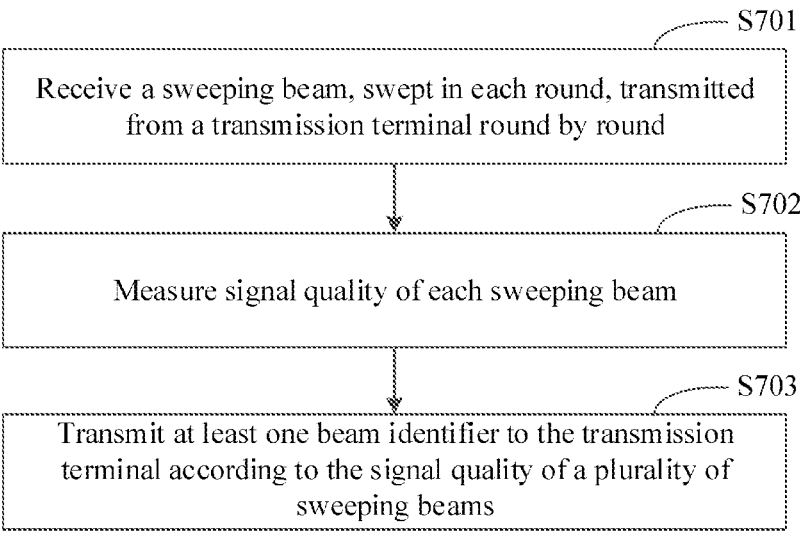
FIG. 8 is a schematic diagram of yet another method for obtaining an AOD according to an example of the disclosure.

FIG. 8 is a schematic diagram of yet another method for obtaining an AOD according to an example of the disclosure.

As shown in FIG. 8, the method for obtaining an AOD according to the example of the disclosure includes the following steps:

S701, a sweeping beam, swept in each round, transmitted from a transmission terminal is received round by round.

It may be understood that an AOD of the transmission terminal is likely to change because positions of the transmission terminal and a reception terminal are likely to change. In the example of the disclosure, under the condition that the reception terminal may receive the sweeping beam, swept in each round, transmitted from the transmission terminal round by round, at least one beam identifier may be re-determined in each round of sweeping, such that the transmission terminal may update the AOD of the transmission terminal according to the at least one beam identifier re-determined, and the AOD of the transmission terminal may be updated in time.

sweeping beam swept in each round transmitted from the transmission terminal may be received round by round according to two possible embodiments as follows:

Embodiment 1, the sweeping beam, swept in each round, transmitted from the transmission terminal is received according to the number of sweeping rounds negotiated with the transmission terminal.

In the example of the disclosure, the reception terminal may negotiate the number of sweeping rounds with the transmission terminal in advance, and the sweeping beam, swept in each round, transmitted from the transmission terminal may be received according to the number of sweeping rounds negotiated with the transmission terminal.

The number of sweeping rounds may be negotiated and set according to an actual condition, and may be set as 10 rounds, for example.

For example, under the condition that the number of sweeping rounds is 10 rounds, the reception terminal may receive the plurality of sweeping beams transmitted from the transmission terminal in each round of sweeping, and the number of reception rounds is 10 rounds in total.

In aspects of Embodiment 2, indication information transmitted from the transmission terminal is received, where the indication information is configured to indicate whether a sweeping beam in a next round is present. The indication information is transmitted from the transmission terminal after each time sweeping is completed or the beam identifier is received.

In the example of the disclosure, the transmission terminal may transmit the indication information to the reception terminal after each time sweeping is completed or the beam identifier is received. The indication information is configured to indicate whether the sweeping beam in the next round is present. Further, the reception terminal may receive the indication information transmitted from the transmission terminal.

It may be understood that in response to the indication information that the sweeping beam in the next round is present, the reception terminal may receive the sweeping beam transmitted from the transmission terminal after a next round of sweeping. Conversely, in response to the indication information that the sweeping beam in the next round is not present, the reception terminal may stop receiving the sweeping beam transmitted from the transmission terminal after a next round of sweeping.

In the example of the disclosure, the indication information further includes start time of the next round of sweeping. In this case, the reception terminal may receive the sweeping beam according to the start time of the next round of sweeping.

In the example of the disclosure, under the condition that the beam identifier may be a beam identifier corresponding to a sweeping beam having optimal signal quality in the sweeping beams swept in each round, the beam identifier may be re-determined in each round of sweeping, such that the transmission terminal may update the AOD of the transmission terminal according to the beam identifier re-determined, and the AOD of the transmission terminal may be updated in time.

S702, signal quality of each sweeping beam is measured.

S703, at least one beam identifier is transmitted to the transmission terminal according to the signal quality of the plurality of sweeping beams.

Reference may be made to the above examples for the related contents of S702-S703, which will not be repeated here.

According to the method for obtaining an AOD of the example of the disclosure, the reception terminal receives the sweeping beam, swept in each round, transmitted from the transmission terminal round by round, the signal quality of each sweeping beam is measured, and then the at least one beam identifier may be transmitted to the transmission terminal according to the signal quality of the plurality of sweeping beams. In this way, under the condition that the reception terminal may receive the sweeping beam, swept in each round, transmitted from the transmission terminal round by round, the beam identifier may be re-determined in each round of sweeping, such that the transmission terminal may update the AOD of the transmission terminal according to the beam identifier re-determined, and the AOD of the transmission terminal may be updated in time.

Figure 9:
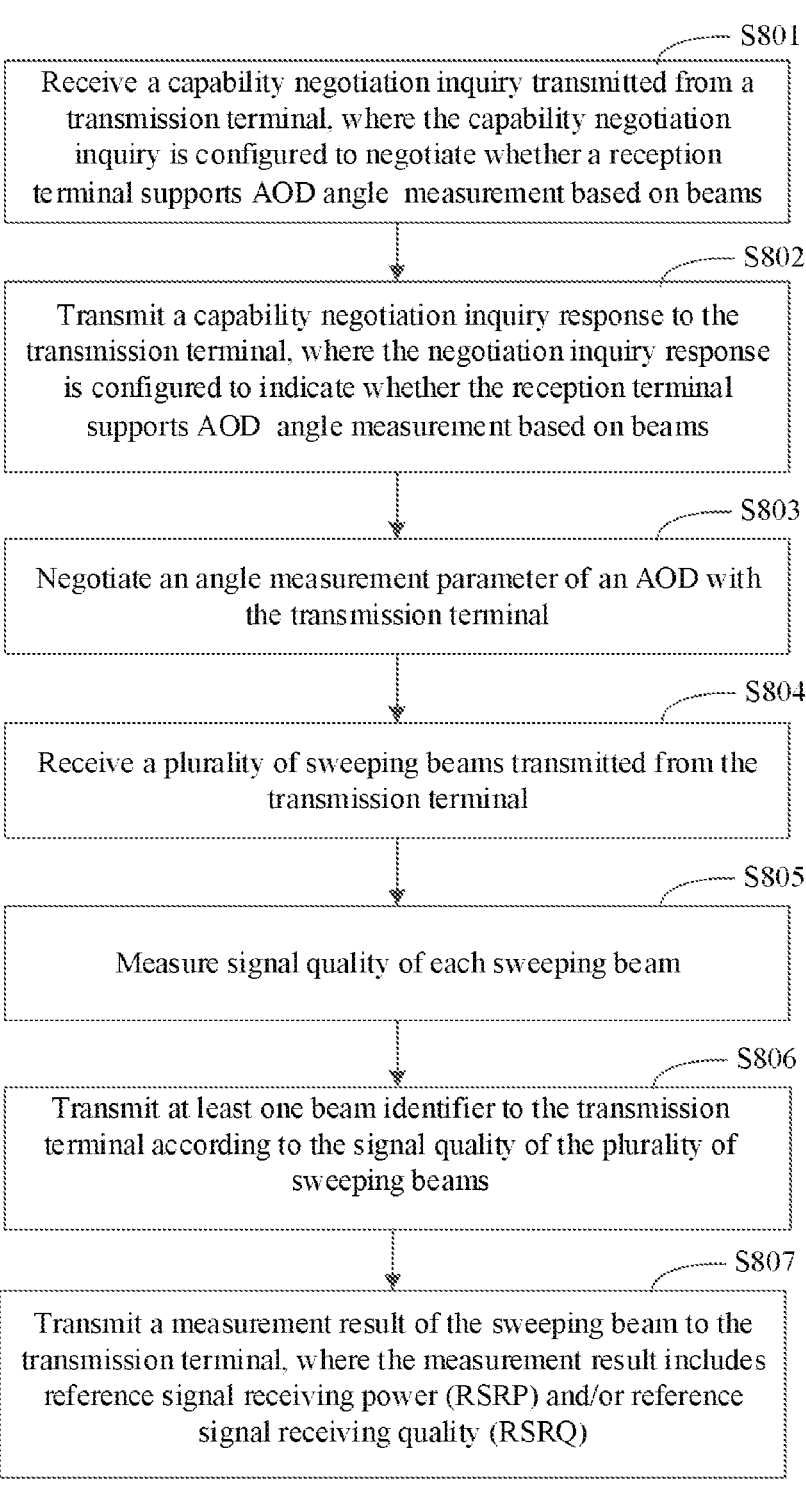
FIG. 9 is a schematic diagram of yet another method for obtaining an AOD according to an example of the disclosure.

FIG. 9 is a schematic diagram of a method for obtaining an AOD according to an example of the disclosure.

As shown in FIG. 9, the method for obtaining an AOD according to the example of the disclosure includes the following steps:

S801, a capability negotiation inquiry transmitted from a transmission terminal is received, where the capability negotiation inquiry is configured to negotiate whether a reception terminal supports AOD angle measurement based on beams.

In the example of the disclosure, before the reception terminal receives a plurality of sweeping beams transmitted from the transmission terminal, the capability negotiation inquiry transmitted from the transmission terminal may be received, where the capability negotiation inquiry is configured to negotiate whether the reception terminal supports AOD angle measurement based on beams.

S802, a capability negotiation inquiry response is transmitted to the transmission terminal, where the negotiation inquiry response is configured to indicate the reception terminal supports AOD angle measurement based on beams.

In the example of the disclosure, the reception terminal may transmit the capability negotiation inquiry response to the transmission terminal, where the negotiation inquiry response indicates the reception terminal supports AOD angle measurement based on beams, which indicates that the method for obtaining an AOD of terminals according to the example of the disclosure may be applied to the reception terminal and the following steps S803-S807 may be continued.

As another possible embodiment, the negotiation inquiry response indicates the reception terminal does not support AOD angle measurement based on beams, which indicates that the method for obtaining an AOD of terminals according to the example of the disclosure cannot be applied to the reception terminal and the following steps S803-S807 do not need to be continued.

In the example of the disclosure, the capability negotiation inquiry may be received or the capability negotiation inquiry response may be transmitted through a user equipment capability inquiry sidelink or a user equipment capability information sidelink.

S803, an angle measurement parameter of an AOD is negotiated with the transmission terminal.

In the example of the disclosure, before the reception terminal receives the plurality of sweeping beams transmitted from the transmission terminal, the angle measurement parameter of the AOD may be negotiated with the transmission terminal. It may be understood that the angle measurement parameter is configured to instruct the transmission terminal to transmit the plurality of sweeping beams to the reception terminal.

In the example of the disclosure, the angle measurement parameter includes one or more of the following parameters: the number of the sweeping beams transmitted, a sweeping interval, the number of the beam identifiers fed back, the number of sweeping rounds, a sweeping interval of each round, the number of the sweeping beams swept in each round, time frequency resource information used by the sweeping beams, and the angle measurement period for triggering angle measurement.

The sweeping interval may include a time interval between the adjacent sweeping beams transmitted, the sweeping interval of each round may include a time interval between two adjacent rounds of sweeping beams transmitted, and the time frequency resource information used by the sweeping beams may include a resource pool used by the sweeping beams, starting time of the sweeping beam, etc.

In the example of the disclosure, the angle measurement parameter of the AOD may be negotiated with the transmission terminal in one of the following methods:

Method 1, an angle measurement inquiry transmitted from the transmission terminal is received, where the angle measurement inquiry carries the angle measurement parameter.

Method 2, an angle measurement inquiry response is transmitted to the transmission terminal, where the angle measurement inquiry response carries the angle measurement parameter.

In the example of the disclosure, the above angle measurement inquiry or angle measurement inquiry response may be transmitted through a radio resource control (RRC) message corresponding to a link interface (PC5) between terminals (PC5-RRC for short) and a signaling protocol message corresponding to the link interface (PC5) between the terminals (PC5-S for short).

Method 3, resource scheduling information transmitted from the transmission terminal is received, where the resource scheduling information includes the angle measurement parameter.

In the example of the disclosure, a resource pool is configured for the transmission terminal in advance, and the transmission terminal may schedule resources from the resource pool according to a certain resource scheduling rule. In order to ensure information transmission with the reception terminal, the corresponding resource scheduling information may be transmitted to the reception terminal.

Method 4, negotiation indication information transmitted from the transmission terminal is received, where the negotiation indication information carries the angle measurement parameter.

In the example of the disclosure, the angle measurement inquiry, the angle measurement inquiry response, the resource scheduling information and the negotiation indication information in the above four ways may be transmitted through radio resource control (RRC) signaling or other signaling.

S804, the plurality of sweeping beams transmitted from the transmission terminal are received.

S805, signal quality of each sweeping beam is measured.

S806, at least one beam identifier is transmitted to the transmission terminal according to the signal quality of the plurality of sweeping beams.

Reference may be made to the above examples for the related contents of S804-806, which will not be repeated here.

S807, a measurement result of the sweeping beam is transmitted to the transmission terminal, where the measurement result includes reference signal receiving power (RSRP) and/or reference signal receiving quality (RSRQ).

In the example of the disclosure, after the reception terminal transmits the at least one beam identifier to the transmission terminal, the measurement result of the sweeping beam may be transmitted to the transmission terminal. The measurement result includes the reference signal receiving power (RSRP) and/or the reference signal receiving quality (RSRQ).

According to the method for obtaining an AOD of the example of the disclosure, the reception terminal may receive the capability negotiation inquiry transmitted from the transmission terminal, then the capability negotiation inquiry response is transmitted to the transmission terminal, where the negotiation inquiry response is configured to indicate the reception terminal supports AOD angle measurement based on beams, then the angle measurement parameter of the AOD is negotiated with the transmission terminal, then the plurality of sweeping beams transmitted from the transmission terminal are received, further the signal quality of each sweeping beam is measured, then the at least one beam identifier is transmitted to the transmission terminal according to the signal quality of the plurality of sweeping beams, and the measurement result of the sweeping beam may be transmitted to the transmission terminal. The measurement result includes the reference signal receiving power (RSRP) and/or the reference signal receiving quality (RSRQ). In this way, the reception terminal may transmit the at least one beam identifier to the transmission terminal, such that the transmission terminal may determine the AOD of the transmission terminal according to the beam identifier.

Figure 10:
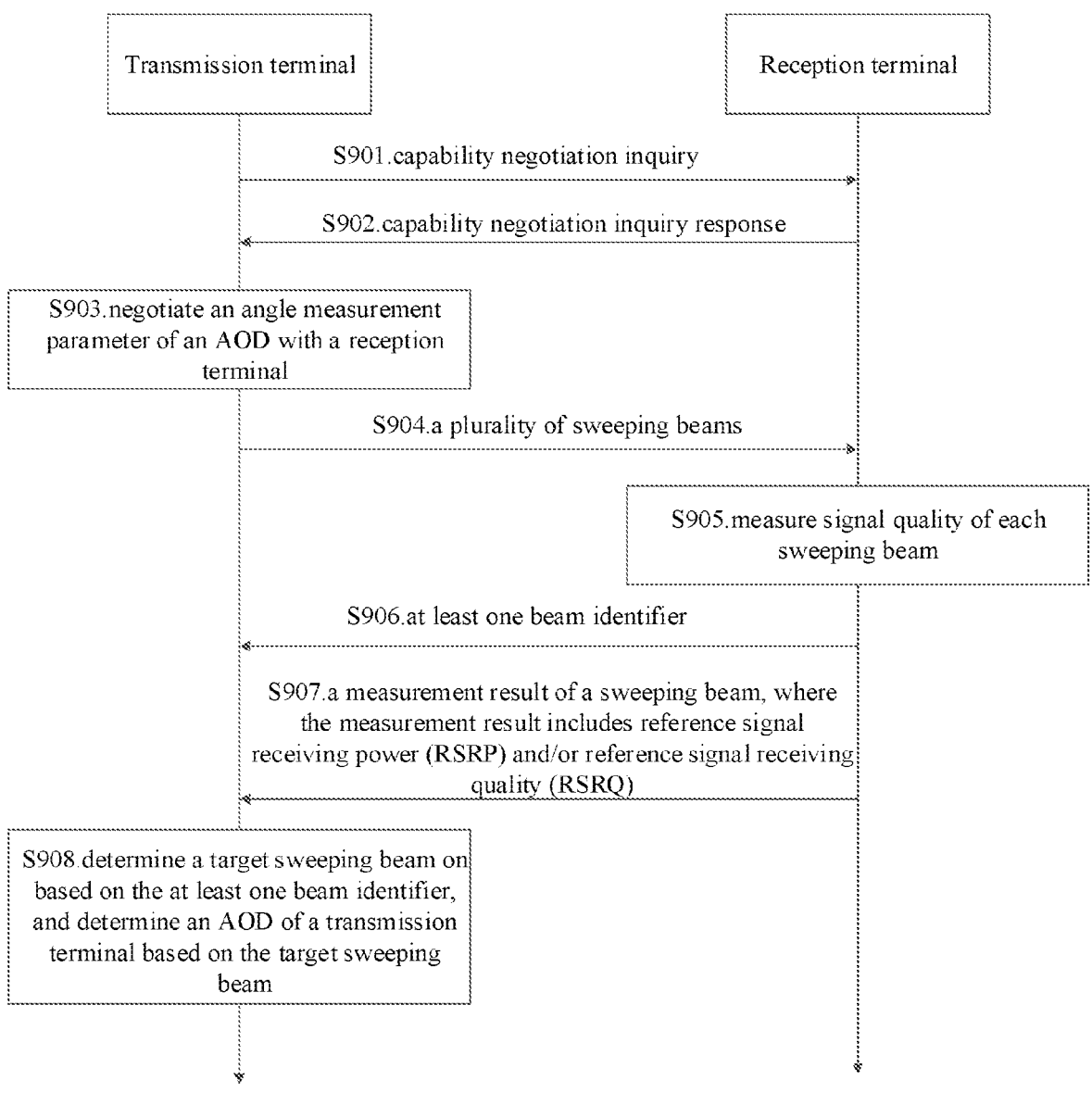
FIG. 10 is a schematic diagram of interaction of a method for obtaining an AOD according to an example of the disclosure.

FIG. 10 is a schematic diagram of interaction of a method for obtaining an AOD according to an example of the disclosure.

As shown in FIG. 10, the method for obtaining an AOD according to the example of the disclosure includes the following steps:

S901, a transmission terminal transmits a capability negotiation inquiry to a reception terminal, where the capability negotiation inquiry is configured to negotiate whether the reception terminal supports AOD angle measurement based on beams.

S902, the reception terminal transmits a capability negotiation inquiry response to the transmission terminal, where the negotiation inquiry response is configured to indicate whether the reception terminal supports AOD angle measurement based on beams.

In the example of the disclosure, the reception terminal may transmit the capability negotiation inquiry response to the transmission terminal, where the negotiation inquiry response is configured to indicate the reception terminal supports AOD angle measurement based on beams, which indicates that the method for obtaining an AOD according to the example of the disclosure may be applied to the reception terminal and the following steps S903-S908 may be continued.

As another possible embodiment, the negotiation inquiry response indicates the reception terminal does not support AOD angle measurement based on beams, which indicates that the method for obtaining an AOD according to the example of the disclosure cannot be applied to the reception terminal and the following steps S903-S908 do not need to be continued.

S903, the transmission terminal negotiates an angle measurement parameter of an AOD with the reception terminal.

S904, the transmission terminal transmits a plurality of sweeping beams to the reception terminal.

S905, the reception terminal measures signal quality of each sweeping beam.

S906, the reception terminal transmits at least one beam identifier to the transmission terminal according to the signal quality of the plurality of sweeping beams.

S907, the reception terminal transmits a measurement result of the sweeping beam to the transmission terminal, where the measurement result includes reference signal receiving power (RSRP) and/or reference signal receiving quality (RSRQ).

S908, the transmission terminal determines a target sweeping beam on the basis of the at least one beam identifier, and an AOD of the transmission terminal is determined on the basis of the target sweeping beam.

Reference may be made to the above examples for the related contents of S901-S908, which will not be repeated here.

In the example of the disclosure, direct communication between devices is supported in LTE networks and NR. The direct communication between devices may be achieved on the basis of a sidelink technology. A sidelink interface between two terminals is called a PC5 interface. The PC5 interface supports two protocols. The protocols include a radio resource control (RRC) protocol corresponding to PC5 (a PC5-RRC protocol for short) and a signaling protocol corresponding to PC5 (a PC5-S protocol for short).

The PC5 interface supports communication modes such as broadcast, multicast, and unicast.

When terminal A and terminal B establish communication in a unicast communication mode of the PC5 interface, both the terminal A and the terminal B may determine their own target identifiers for reception. A vehicle to everything (V2X) application layer of the terminal A may provide a service type of V2X application for a PC5 protocol layer, and then the terminal A may transmit an indication information inquiry (direct communication request) to the terminal B. The terminal B may feed back a security establishment message to the terminal A, then both the terminal A and the terminal B may be subjected to security establishment, and then the terminal A may transmit Internet protocol (IP) address configuration information to the terminal B. The terminal B may feed back an indication information (direct communication accept) message to the terminal A. Finally, both the terminal A and the terminal B may provide PC5 interface identifiers for an application server (AS), so as to establish communication between the terminal A and the terminal B.

Figure 11:
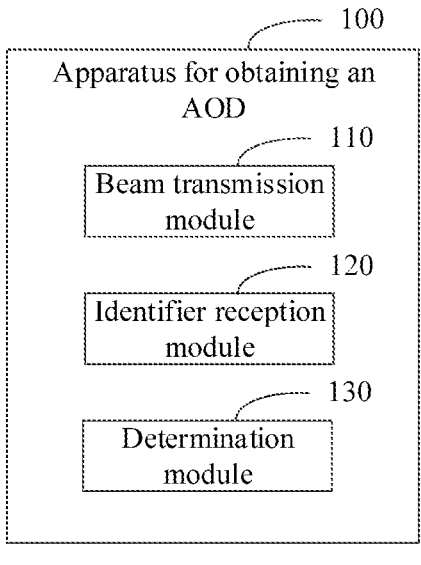
FIG. 11 is a schematic structural diagram of an apparatus for obtaining an AOD according to an example of the disclosure.
Figure 12:
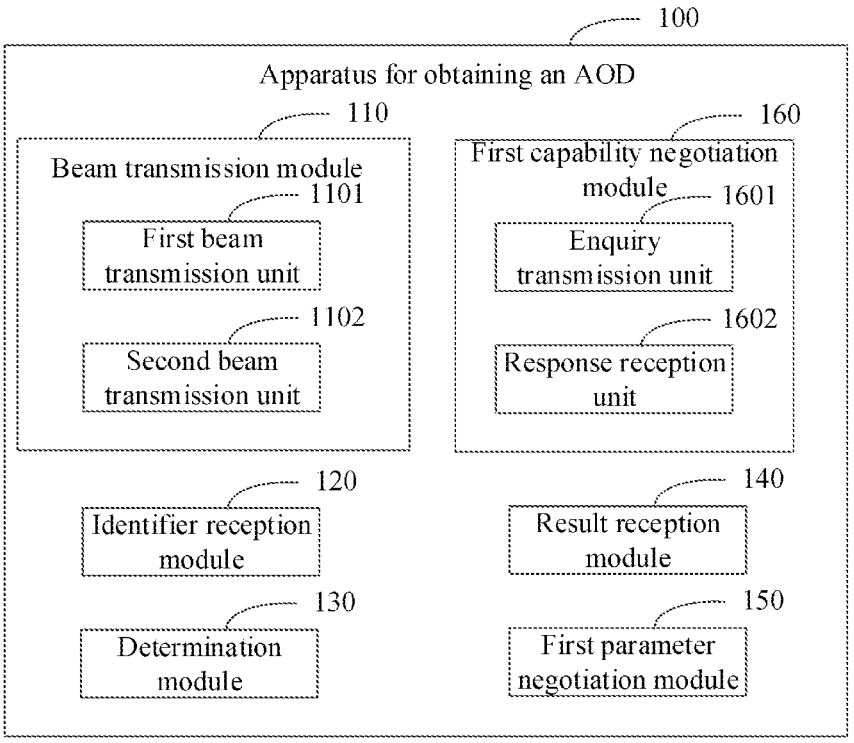
FIG. 12 is a schematic structural diagram of another apparatus for obtaining an AOD according to an example of the disclosure.

Corresponding to the method for obtaining an AOD according to the above examples, the disclosure further provides the apparatus for obtaining an AOD. Since the apparatus for obtaining an AOD according to the example of the disclosure corresponds to the method for obtaining an AOD according to the above examples of FIGS. 1-5, the embodiments of the method for obtaining an AOD are also applicable to the apparatus for obtaining an AOD according to the example, which will not be described in detail in the example. FIGS. 11-12 are schematic structural diagrams of an apparatus for obtaining an AOD according to the disclosure.

FIG. 11 is a schematic structural diagram of an apparatus for obtaining an AOD according to an example of the disclosure.

As shown in FIG. 11, the apparatus 100 for obtaining an AOD includes a beam transmission module 110, an identifier reception module 120, and a determination module 130.

The beam transmission module 110 is configured to transmit a plurality of sweeping beams to a reception terminal.

The identifier reception module 120 is configured to receive at least one beam identifier, where the at least one beam identifier is determined according to signal quality of the plurality of sweeping beams.

The determination module 130 is configured to determine a target sweeping beam on the basis of a unique beam identifier obtained through the at least one beam identifier, and determine an AOD of a transmission terminal on the basis of the target sweeping beam.

In the example of the disclosure, the at least one beam identifier is a beam identifier selected in descending order of the signal quality of the plurality of sweeping beams.

In the example of the disclosure, as shown in FIG. 12, the beam transmission module 110 includes: a first beam transmission unit 1101. The first beam transmission unit 1101 is configured to periodically transmit the plurality of sweeping beams to the reception terminal according to an angle measurement period.

In the example of the disclosure, as shown in FIG. 12, the beam transmission module 110 includes: a second beam transmission unit 1102. The second beam transmission unit 1102 is configured to conduct beam sweeping round by round, and transmit the sweeping beam swept in each round to the reception terminal.

In the example of the disclosure, the second beam transmission unit 1102 is further configured to conduct beam sweeping according to the number of sweeping rounds negotiated with the reception terminal; and alternatively, transmit indication information to the reception terminal after each time sweeping is completed or the beam identifier is received, where the indication information is configured to indicate whether a sweeping beam in a next round is present.

In the example of the disclosure, the indication information further includes start time of a next round of sweeping.

In the example of the disclosure, the beam identifier is a beam identifier corresponding to the sweeping beam having optimal signal quality in the sweeping beams swept in each round. The second beam transmission unit 1102 includes: a first determination sub-unit configured to determine a first beam azimuth angle of the sweeping beam in the next round according to the beam identifier received in a last round and a current round number; and a sweeping sub-unit configured to conduct a next round of beam sweeping according to the first beam azimuth angle.

In the example of the disclosure, the second beam transmission unit 1102 further includes: a second determination sub-unit configured to determine a second beam azimuth angle of the sweeping beam according to the sweeping beam identified by the beam identifier and the current round number; and a division sub-unit configured to divide the second beam azimuth angle according to the number of beams to be swept in each round, and determine the first beam azimuth angle of the next round.

In the example of the disclosure, the beam identifier of each sweeping beam is determined according to a corresponding transmission position of the sweeping beam, and alternatively, each sweeping beam carries its own beam identifier.

In the example of the disclosure, as shown in FIG. 12, the apparatus 100 for obtaining an AOD further includes: a result reception module 140. The result reception module 140 is configured to receive a measurement result of the sweeping beam. The measurement result includes reference signal receiving power (RSRP) and/or reference signal receiving quality (RSRQ).

In the example of the disclosure, as shown in FIG. 12, the apparatus 100 for obtaining an AOD further includes: a first parameter negotiation module 150. The first parameter negotiation module 150 is configured to negotiate, before the plurality of sweeping beams are transmitted to the reception terminal, an angle measurement parameter of the AOD with the reception terminal in one of the following ways: an angle measurement inquiry is transmitted to the reception terminal, where the angle measurement inquiry carries the angle measurement parameter; and alternatively, an angle measurement inquiry response transmitted from the reception terminal is received, where the angle measurement inquiry response carries the angle measurement parameter; and alternatively, resource scheduling information is transmitted to the reception terminal, where the resource scheduling information includes the angle measurement parameter; and alternatively, negotiation indication information is transmitted to the reception terminal, where the negotiation indication information carries the angle measurement parameter.

In the example of the disclosure, the angle measurement parameter includes one or more of the following parameters: the number of the sweeping beams transmitted, a sweeping interval, the number of the beam identifiers fed back, the number of sweeping rounds, a sweeping interval of each round, the number of the sweeping beams swept in each round, time frequency resource information used by the sweeping beams, and the angle measurement period for triggering angle measurement.

In the example of the disclosure, as shown in FIG. 12, the apparatus 100 for obtaining an AOD further includes: a first capability negotiation module 160. The first capability negotiation module 160 includes: an inquiry transmission unit 1601 configured to transmit a capability negotiation inquiry to the reception terminal, where the capability negotiation inquiry is configured to negotiate whether the reception terminal supports AOD angle measurement based on beams; and a response reception unit 1602 configured to receive a capability negotiation inquiry response transmitted from the reception terminal, where the negotiation inquiry response is configured to indicate whether the reception terminal supports AOD angle measurement based on beams.

In the example of the disclosure, the first capability negotiation module 160 is configured to transmit the capability negotiation inquiry or receive the capability negotiation inquiry response through a user equipment capability inquiry sidelink or a user equipment capability information sidelink.

According to the apparatus for obtaining an AOD of the example of the disclosure, the plurality of sweeping beams may be transmitted to the reception terminal; then the at least one beam identifier is received, where the at least one beam identifier is determined according to the signal quality of the plurality of sweeping beams; and then the target sweeping beam is determined on the basis of the unique beam identifier obtained through the at least one beam identifier, and the AOD of the transmission terminal is determined on the basis of the target sweeping beam. In this way, the transmission terminal may transmit the sweeping beams to the reception terminal, and the AOD of the transmission terminal may be determined according to the unique beam identifier, such that the AOD may be obtained in LTE networks and NR.

Figure 13:
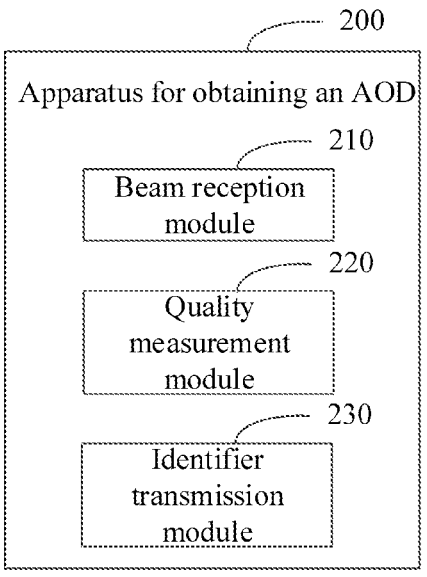
FIG. 13 is a schematic structural diagram of yet another apparatus for obtaining an AOD according to an example of the disclosure.
Figure 14:
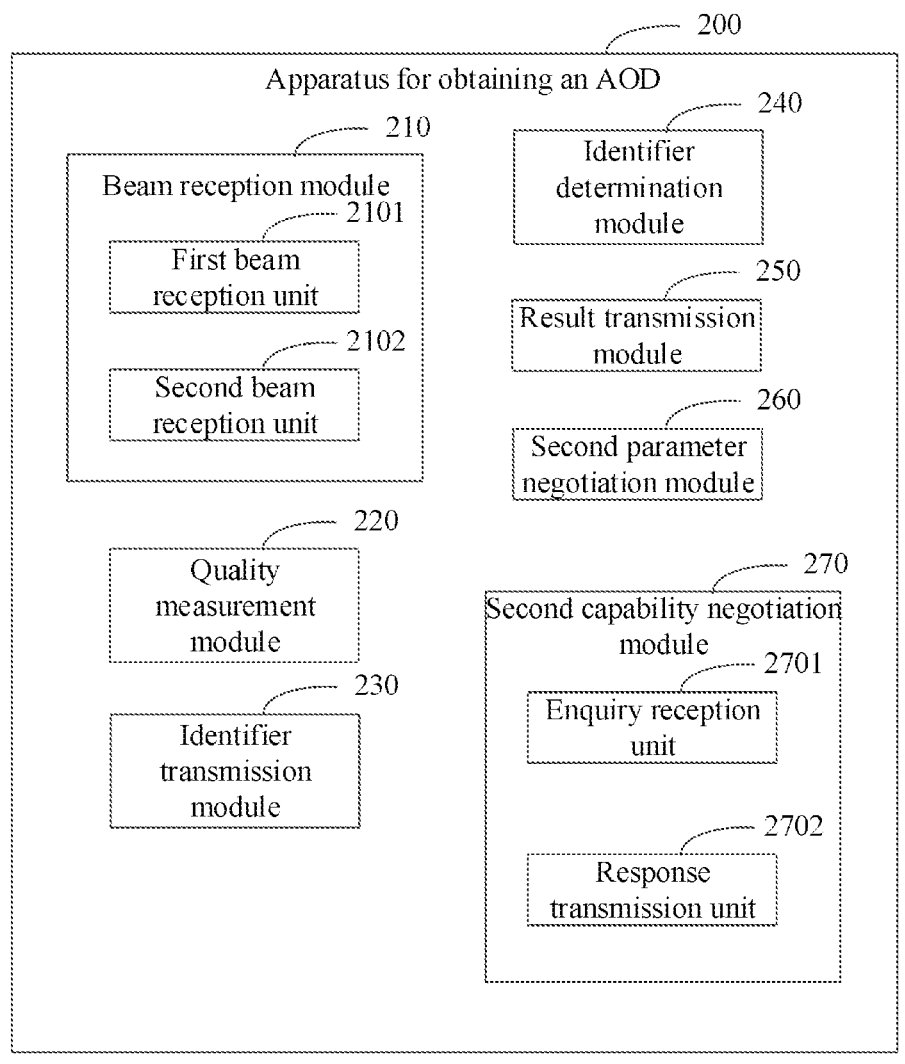
FIG. 14 is a schematic structural diagram of yet another apparatus for obtaining an AOD according to an example of the disclosure.

Corresponding to the method for obtaining an AOD according to the above examples, the disclosure further provides the apparatus for obtaining an AOD. Since the apparatus for obtaining an AOD according to the example of the disclosure corresponds to the method for obtaining an AOD according to the above examples of FIGS. 6-9, the embodiments of the method for obtaining an AOD are also applicable to the apparatus for obtaining an AOD according to the example, which will not be described in detail in the example. FIGS. 13-14 are schematic structural diagrams of an apparatus for obtaining an AOD according to the disclosure.

FIG. 13 is a schematic structural diagram of an apparatus for obtaining an AOD according to an example of the disclosure.

As shown in FIG. 13, the apparatus 200 for obtaining an AOD includes: a beam reception module 210, a quality measurement module 220, and an identifier transmission module 230.

The beam reception module 210 is configured to receive a plurality of sweeping beams transmitted from a transmission terminal.

The quality measurement module 220 is configured to measure signal quality of each sweeping beam.

The identifier transmission module 230 is configured to transmit at least one beam identifier to the transmission terminal according to the signal quality of the plurality of sweeping beams.

In the example of the disclosure, the at least one beam identifier is a beam identifier selected in descending order of the signal quality of the plurality of sweeping beams.

In the example of the disclosure, as shown in FIG. 14, the beam reception module 210 includes: a first beam reception unit 2101. The first beam reception unit 2101 is configured to receive, according to an angle measurement period, the plurality of sweeping beams periodically transmitted from the transmission terminal.

In the example of the disclosure, as shown in FIG. 14, the beam reception module 210 includes: a second beam reception unit 2102. The second beam reception unit 2102 receives the sweeping beam, swept in each round, transmitted from the transmission terminal round by round.

In the example of the disclosure, the second beam reception unit 2102 is further configured to receive the sweeping beam, swept in each round, transmitted from the transmission terminal according to the number of sweeping rounds negotiated with the transmission terminal; and alternatively, receive indication information transmitted from the transmission terminal, where the indication information is configured to indicate whether a sweeping beam in a next round is present; and the indication information is transmitted from the transmission terminal after each time sweeping is completed or the at least one beam identifier is received; and receive, in response to the indication information that the sweeping beam in the next round is present, the sweeping beam transmitted from the transmission terminal after a next round of sweeping.

In the example of the disclosure, the indication information further includes start time of a next round of sweeping.

In the example of the disclosure, the beam identifier is a beam identifier corresponding to the sweeping beam having optimal signal quality in the sweeping beams swept in each round.

In the example of the disclosure, as shown in FIG. 14, the apparatus 200 for obtaining an AOD further includes: an identifier determination module 240. The identifier determination module 240 is configured to determine the beam identifier of the sweeping beam according to a transmission position of the sweeping beam; and alternatively, extract the beam identifier of the sweeping beam from the sweeping beam.

In the example of the disclosure, as shown in FIG. 14, the apparatus 200 for obtaining an AOD further includes: a result transmission module 250. The result transmission module 250 is configured to transmit a measurement result of the sweeping beam to the transmission terminal, where the measurement result includes reference signal receiving power (RSRP) and/or reference signal receiving quality (RSRQ).

In the example of the disclosure, as shown in FIG. 14, the apparatus 200 for obtaining an AOD further includes: a second parameter negotiation module 260. The second parameter negotiation module 260 is configured to negotiate, before the plurality of sweeping beams transmitted from the transmission terminal are received, an angle measurement parameter of the AOD with the transmission terminal in one of the following ways: an angle measurement inquiry transmitted from the transmission terminal is received, where the angle measurement inquiry carries the angle measurement parameter; and alternatively, an angle measurement inquiry response is transmitted to the transmission terminal, where the angle measurement inquiry response carries the angle measurement parameter; and alternatively, resource scheduling information transmitted from the transmission terminal is received, where the resource scheduling information includes the angle measurement parameter; and alternatively, negotiation indication information transmitted from the transmission terminal is received, where the negotiation indication information carries the angle measurement parameter.

In the example of the disclosure, the angle measurement parameter includes one or more of the following parameters: the number of the sweeping beams transmitted, a sweeping interval, the number of the beam identifiers fed back, the number of sweeping rounds, a sweeping interval of each round, the number of the sweeping beams swept in each round, time frequency resource information used by the sweeping beams, and the angle measurement period for triggering angle measurement.

In the example of the disclosure, as shown in FIG. 14, the apparatus 200 for obtaining an AOD further includes: a second capability negotiation module 270. The second capability negotiation module 270 includes: an inquiry reception unit 2701 configured to receive a capability negotiation inquiry transmitted from the transmission terminal, where the capability negotiation inquiry is configured to negotiate whether a reception terminal supports AOD angle measurement based on beams; and a response transmission unit 2702 configured to transmit a capability negotiation inquiry response to the transmission terminal, where the negotiation inquiry response is configured to indicate whether the reception terminal supports AOD angle measurement based on beams.

In the example of the disclosure, the second capability negotiation module 270 is configured to receive the capability negotiation inquiry or transmit the capability negotiation inquiry response through a user equipment capability inquiry sidelink or a user equipment capability information sidelink.

According to the apparatus for obtaining an AOD of the example of the disclosure, the plurality of sweeping beams transmitted from the transmission terminal may be received; the signal quality of each sweeping beam may be measured; and then the at least one beam identifier may be transmitted to the transmission terminal according to the signal quality of the plurality of sweeping beams. In this way, the at least one beam identifier may be transmitted to the transmission terminal, such that the transmission terminal may determine the AOD of the transmission terminal according to the beam identifier.

According to an example of the disclosure, the disclosure further provides a communication device and a readable storage medium.

Figure 15:
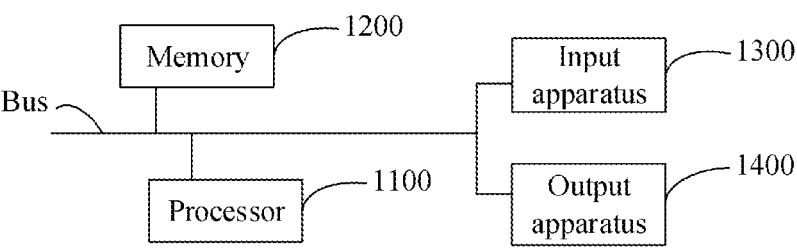
FIG. 15 is a schematic diagram of a communication device according to an example of the disclosure.

FIG. 15 is a block diagram of a communication device according to an example of the disclosure. The communication device is intended to represent various forms of digital computers, such as a laptop computer, a desktop computer, a workstation, a personal digital assistant, a server, a blade server, a mainframe computer, and other suitable computers. The communication device may also represent various forms of mobile apparatuses, such as a personal digital assistant, a cellular phone, a smart phone, a wearable device, and other similar computing apparatuses. The components shown here, and their connections, relations and functions are only illustrative, and are not intended to limit implementation of the disclosure described and/or claimed here.

As shown in FIG. 15, the communication device includes: one or more processors 1100, a memory 1200, and interfaces for connecting all components, which include a high-speed interface and a low-speed interface. All the components are connected to one another by using different buses, and may be mounted on a common mainboard or in other ways as required. The processor may process instructions executed in the communication device, which include instructions stored in or on the memory so as to display graphical information of a graphical user interface (GUI) on an external input/output apparatus (such as a display device coupled to the interface). In other embodiments, a plurality of processors and/or a plurality of buses may be used with a plurality of memories, if desired. Similarly, a plurality of communication devices may be connected, and each device provides some necessary operations (for example, serving as a server array, a group of blade servers, or a multiprocessor system). In FIG. 15, a processor 1100 is taken as an example.

The memory 1200 is a non-transitory computer-readable storage medium according to the disclosure. The memory stores an instruction executable by at least one processor, so as to enable the at least one processor to execute the method for obtaining an AOD according to the disclosure. The non-transitory computer-readable storage medium of the disclosure stores a computer instruction, and the computer instruction enables a computer to execute the method for obtaining an AOD according to the disclosure.

As a non-transitory computer-readable storage medium, the memory 1200 may be configured to store a non-transitory software program, a non-transitory computer executable program, and modules, such as program instructions/modules (for example, the beam transmission module 110, the identifier reception module 120 and the determination module 130 as shown in FIG. 11) corresponding to the method for obtaining an AOD according to the example of the disclosure. The processor 1100 executes various functional applications and data processing of a server by running the non-transitory software program, the instruction and the modules stored in the memory 1200, that is, implements the method for obtaining an AOD according to the method example.

The memory 1200 may include a program storage area and a data storage area, where the program storage area may store an operating system, an application required for at least one function; and the data storage area may store data, etc. created according to usage of a positioning communication device. Moreover, the memory 1200 may include a high-speed random access memory, and may further include a non-volatile memory, for example, at least one magnetic disk memory device, a flash memory device, or other non-volatile solid-state memory devices. Alternatively, the memory 1200 may include a memory remotely arranged with respect to the processor 1100, and the remote memory may be connected to the positioning communication device by means of a network. Examples of the network include, but are not limited to, the Internet, enterprise intranets, local area networks, mobile communication networks, and combinations of the above.

The communication device may further include: an input apparatus 1300 and an output apparatus 1400. The processor 1100, the memory 1200, the input apparatus 1300 and the output apparatus 1400 may be connected by means of buses or in other ways. In FIG. 11, bus connection is taken as an example.

The input apparatus 1300 may receive input digital or character information and generate key signal input related to user settings and function control of the positioning communication device, for example, a touch screen, a keypad, a mouse, a track pad, a touch pad, an indication rod, one or more mouse buttons, a trackball, a joystick, and other input apparatuses. The output apparatus 1400 may include a display device, an auxiliary lighting apparatus (for example, a light emitting diode (LED)), a tactile feedback apparatus (for example, a vibration motor), etc. The display device may include, but is not limited to, a liquid crystal display (LCD), an LED display, and a plasma display. In some embodiments, the display device may be a touch screen.

Various embodiments of the systems and technologies described here may be implemented in a digital electronic circuit system, an integrated circuit system, an application-specific integrated circuit (ASIC), computer hardware, firm-ware, software, and/or their combinations. All the embodiments may include: an implementation in one or more computer programs, which may be executed and/or interpreted on a programmable system including at least one programmable processor, and the programmable processor may be a special-purpose or general-purpose programmable processor and capable of receiving and transmitting data and instructions from a storage system, at least one input apparatus, and at least one output apparatus.

Computation programs (also called programs, software, software applications, or codes) include a machine instruction of a programmable processor, and may be implemented by using high-level processes and/or object-oriented programming languages, and/or assembly/machine languages. As used here, the terms "machine-readable medium" and "computer-readable medium" refer to any computer program product, device, and/or apparatus (for example, a magnetic disk, an optical disk, a memory, a programmable logic device (PLD)) configured to provide a machine instruction and/or data for a programmable processor, including a machine-readable medium receiving a machine instruction as a machine-readable signal. The term "machine-readable signal" refers to any signal configured to provide a machine instruction and/or data for a programmable processor.

To provide interaction with a user, the systems and technologies described here may be implemented on a computer. The computer has: a display apparatus (for example, a cathode ray tube (CRT) or a liquid crystal display (LCD) monitor) configured to display information to the user; and a keyboard and a pointing apparatus (for example, a mouse or a trackball), through which the user may provide input for the computer. Other kinds of apparatuses may also provide interaction with the user. For example, feedback provided for the user may be any form of sensory feedback (for example, visual feedback, auditory feedback, or tactile feedback); and input from the user may be received in any form, including acoustic input, voice input, or tactile input.

The systems and technologies described here may be implemented in a computing system (for example, as a data server) including a background component, or a computing system (for example, an application server) including a middleware component, or a computing system (for example, a user computer having a graphical user interface or a web browser through which a user may interact with the embodiments of the systems and technologies described here) including a front-end component, or a computing system including any combination of such background components, middleware components, or front-end components. The components of the system may be connected to each other through digital data communication in any form or medium (for example, a communication network). Examples of the communication network include: a local area network (LAN), a wide area network (WAN), and the Internet.

A computer system may include a client and a server. The client and the server are generally far away from each other and typically interact with each other through a communication network. A relation between the client and the server is generated by computer programs operating on corresponding computers and having a client-server relationship with each other.

According to the method for obtaining an AOD of the example of the disclosure, the transmission terminal may transmit the plurality of sweeping beams to the reception terminal; then the at least one beam identifier is received, where the at least one beam identifier is determined according to the signal quality of the plurality of sweeping beams; and then the target sweeping beam is determined on the basis of the unique beam identifier obtained through the at least one beam identifier, and the AOD of the transmission terminal is determined on the basis of the target sweeping beam. In this way, the transmission terminal may transmit the sweeping beams to the reception terminal, and the AOD of the transmission terminal may be determined according to the beam identifier, such that the AOD may be obtained in LTE networks and NR.

It is to be understood that steps may be reordered, added, or deleted on the basis of various forms of procedures shown above. For example, the steps described in the disclosure may be executed concurrently, sequentially or in a different order, so long as the desired results of the technical solutions disclosed in the disclosure can be achieved, which is not limited here.

The specific embodiments do not limit the scope of the disclosure. It will be obvious to those skilled in the art that various modifications, combinations, sub-combinations and substitutions are possible, depending on design requirements and other factors. Any modifications, equivalent substitutions, and improvements within the spirit and principles of the disclosure are intended to be included within the scope of the disclosure.

Additional non-limiting embodiments of the disclosure include:

1. A method for obtaining an angle of departure (AOD), including:

transmitting a plurality of sweeping beams to a reception terminal;

receiving at least one beam identifier, where the at least one beam identifier is determined according to signal quality of the plurality of sweeping beams; and determining a target sweeping beam on the basis of the at least one beam identifier, and determining an AOD of a transmission terminal on the basis of the target sweeping beam.

2. The method for obtaining an AOD according to embodiment 1, where determining a target sweeping beam on the basis of the at least one beam identifier specifically includes:

obtaining a unique beam identifier on the basis of the at least one beam identifier, and determining the target sweeping beam on the basis of the unique beam identifier.

3. The method for obtaining an AOD according to embodiment 2, where the at least one beam identifier is a beam identifier selected in descending order of the signal quality of the plurality of sweeping beams.

4. The method for obtaining an AOD according to embodiment 1, where transmitting a plurality of sweeping beams to a reception terminal includes:

periodically transmitting the plurality of sweeping beams to the reception terminal according to an angle measurement period.

5. The method for obtaining an AOD according to embodiment 1, where transmitting a plurality of sweeping beams to a reception terminal includes:

performing beam sweeping round by round, and transmitting the sweeping beam swept in each round to the reception terminal.

6. The method for obtaining an AOD according to embodiment 5, where performing beam sweeping round by round includes:

performing beam sweeping according to the number of sweeping rounds negotiated with the reception terminal; or, transmitting indication information to the reception terminal after each time sweeping is completed or the beam identifier is received, where the indication information is configured to indicate whether a sweeping beam in a next round is present.

7. The method for obtaining an AOD according to embodiment 6, where the indication information further includes start time of a next round of sweeping.

8. The method for obtaining an AOD according to any one of embodiments 5-7, where the beam identifier is a beam identifier corresponding to the sweeping beam having optimal signal quality in the sweeping beams swept in each round, and performing beam sweeping round by round includes:

determining a first beam azimuth angle of the sweeping beam in the next round according to the beam identifier received in a last round and a current round number; and performing a next round of beam sweeping according to the first beam azimuth angle.

9. The method for obtaining an AOD according to embodiment 7, further including:

determining a second beam azimuth angle of the sweeping beam according to the sweeping beam identified by the beam identifier and a current round number; and dividing the second beam azimuth angle according to the number of beams to be swept in each round, and determining the first beam azimuth angle of the next round.

10. The method for obtaining an AOD according to embodiment 1, where the beam identifier of each sweeping beam is determined according to a corresponding transmission position of the sweeping beam, or, each sweeping beam carries its own beam identifier.

11. The method for obtaining an AOD according to embodiment 1, further including:

receiving a measurement result of the sweeping beam, where the measurement result includes reference signal receiving power (RSRP) and/or reference signal receiving quality (RSRQ).

12. The method for obtaining an AOD according to embodiment 1, where before transmitting a plurality of sweeping beams to a reception terminal, the method further includes:

negotiating an angle measurement parameter of the AOD with the reception terminal in one of the following ways:

transmitting an angle measurement inquiry to the reception terminal, where the angle measurement inquiry carries the angle measurement parameter; or, receiving an angle measurement inquiry response transmitted from the reception terminal, where the angle measurement inquiry response carries the angle measurement parameter; or, transmitting resource scheduling information to the reception terminal, where the resource scheduling information includes the angle measurement parameter; or, transmitting negotiation indication information to the reception terminal, where the negotiation indication information carries the angle measurement parameter.

13. The method for obtaining an AOD according to embodiment 12, where the angle measurement parameter includes one or more of the following parameters:

the number of the sweeping beams transmitted, a sweeping interval, the number of the beam identifiers fed back, the number of sweeping rounds, a sweeping interval of each round, the number of the sweeping beams swept in each round, time frequency resource information used by the sweeping beams, and the angle measurement period for triggering angle measurement.

14. The method for obtaining an AOD according to embodiment 1, where before transmitting a plurality of sweeping beams to a reception terminal, the method further includes:

transmitting a capability negotiation inquiry to the reception terminal, wherein the capability negotiation inquiry is configured to negotiate whether the reception terminal supports AOD angle measurement based on beams; and receiving a capability negotiation inquiry response transmitted from the reception terminal, where the negotiation inquiry response is configured to indicate whether the reception terminal supports AOD angle measurement based on beams.

15. The method for obtaining an AOD according to embodiment 14, where the capability negotiation inquiry is transmitted or the capability negotiation inquiry response is received through a user equipment capability inquiry sidelink or a user equipment capability information sidelink.

16. A method for obtaining an AOD, including:

receiving a plurality of sweeping beams transmitted from a transmission terminal;

measuring signal quality of each sweeping beam; and transmitting at least one beam identifier to the transmission terminal according to the signal quality of the plurality of sweeping beams.

17. The method for obtaining an AOD according to embodiment 16, where the at least one beam identifier is at least one beam identifier selected in descending order of the signal quality of the plurality of sweeping beams.

18. The method for obtaining an AOD according to embodiment 16, where receiving a plurality of sweeping beams transmitted from a transmission terminal includes:

receiving, according to an angle measurement period, the plurality of sweeping beams periodically transmitted from the transmission terminal.

19. The method for obtaining an AOD according to embodiment 16, where receiving a plurality of sweeping beams transmitted from a transmission terminal includes:

receiving the sweeping beam, swept in each round, transmitted from the transmission terminal round by round.

20. The method for obtaining an AOD according to embodiment 19, where receiving the sweeping beam, swept in each round, transmitted from the transmission terminal round by round includes:

receiving the sweeping beam, swept in each round, transmitted from the transmission terminal according to the number of sweeping rounds negotiated with the transmission terminal; or, receiving indication information transmitted from the transmission terminal, where the indication information is configured to indicate whether a sweeping beam in a next round is present; and the indication information is transmitted from the transmission terminal after each time sweeping is completed or the beam identifier is received; and receiving, in response to the indication information that the sweeping beam in the next round is present, the sweeping beam transmitted from the transmission terminal after a next round of sweeping.

21. The method for obtaining an AOD according to embodiment 20, where the indication information further includes start time of the next round of sweeping.

22. The method for obtaining an AOD according to any one of embodiments 19-21, where the beam identifier is a beam identifier corresponding to the sweeping beam having optimal signal quality in the sweeping beams swept in each round.

23. The method for obtaining an AOD according to embodiment 16, further including:

determining the beam identifier of the sweeping beam according to a transmission position of the sweeping beam; or, extracting the beam identifier of the sweeping beam from the sweeping beam.

24. The method for obtaining an AOD according to embodiment 16, further including:

transmitting a measurement result of the sweeping beam to the transmission terminal, where the measurement result includes reference signal receiving power (RSRP) and/or reference signal receiving quality (RSRQ).

25. The method for obtaining an AOD according to embodiment 16, where before receiving a plurality of sweeping beams transmitted from a transmission terminal, the method further includes:

negotiating an angle measurement parameter of the AOD with the transmission terminal in one of the following ways:

receiving an angle measurement inquiry transmitted from the transmission terminal, where the angle measurement inquiry carries the angle measurement parameter; or, transmitting an angle measurement inquiry response to the transmission terminal, where the angle measurement inquiry response carries the angle measurement parameter; or, receiving resource scheduling information transmitted from the transmission terminal, where the resource scheduling information includes the angle measurement parameter; or, receiving negotiation indication information transmitted from the transmission terminal, where the negotiation indication information carries the angle measurement parameter.

26. The method for obtaining an AOD according to embodiment 25, where the angle measurement parameter includes one or more of the following parameters:

the number of the sweeping beams transmitted, a sweeping interval, the number of the beam identifiers fed back, the number of sweeping rounds, a sweeping interval of each round, the number of the sweeping beams swept in each round, time frequency resource information used by the sweeping beams, and the angle measurement period for triggering angle measurement.

27. The method for obtaining an AOD according to embodiment 16, where before receiving a plurality of sweeping beams transmitted from a transmission terminal, the method further includes:

receiving a capability negotiation inquiry transmitted from the transmission terminal, where the capability negotiation inquiry is configured to negotiate whether a reception terminal supports AOD angle measurement based on beams; and transmitting a capability negotiation inquiry response to the transmission terminal, where the negotiation inquiry response is configured to indicate whether the reception terminal supports AOD angle measurement based on beams.

28. The method for obtaining an AOD according to embodiment 27, where the capability negotiation inquiry is received or the capability negotiation inquiry response is transmitted through a user equipment capability inquiry sidelink or a user equipment capability information sidelink.

29. An apparatus for obtaining an AOD, including:

a beam transmission module configured to transmit a plurality of sweeping beams to a reception terminal;

an identifier reception module configured to receive at least one beam identifier, where the at least one beam identifier is determined according to signal quality of the plurality of sweeping beams; and a determination module configured to determine a target sweeping beam on the basis of the at least one beam identifier, and determine an AOD of a transmission terminal on the basis of the target sweeping beam.

30. An apparatus for obtaining an AOD, including:

a beam reception module configured to receive a plurality of sweeping beams transmitted from a transmission terminal;

a quality measurement module configured to measure signal quality of each sweeping beam; and an identifier transmission module configured to transmit at least one beam identifier to the transmission terminal according to the signal quality of the plurality of sweeping beams.

31. A communication device, including:

at least one processor; and a memory communicatively connected to the at least one processor, where the memory stores an instruction executable by the at least one processor, and the instruction enables the at least one processor to execute the method according to any one of embodiments 1-15 or 16-28 when executed by the at least one processor.

32. A computer storage medium, storing a computer executable instruction, where the computer executable instruction is capable of implementing the method according to any one of embodiments 1-15 or 16-28 after executed by a processor.

What is claimed is:

1. A method for obtaining an angle of departure (AOD), comprising:

transmitting a plurality of sweeping beams to a reception terminal;

receiving at least one beam identifier, wherein the at least one beam identifier is determined according to signal quality of the plurality of sweeping beams; and determining a target sweeping beam based on the at least one beam identifier, and determining an AOD of a transmission terminal based on the target sweeping beam, wherein the AOD of the transmission terminal is equal to a beam azimuth angle of the target sweeping beam;

wherein the method further comprises:

transmitting a capability negotiation inquiry to the reception terminal, wherein the capability negotiation inquiry is configured to negotiate whether the reception terminal supports AOD angle measurement based on beams; and receiving a capability negotiation inquiry response transmitted from the reception terminal, wherein the negotiation inquiry response is configured to indicate whether the reception terminal supports the AOD angle measurement based on beams.

2. The method for obtaining an AOD according to claim 1, wherein determining the target sweeping beam based on the at least one beam identifier comprises:

obtaining a unique beam identifier based on the at least one beam identifier, and determining the target sweeping beam based on the unique beam identifier;

wherein the at least one beam identifier is at least one beam identifier selected in a descending order of the signal quality of the plurality of sweeping beams.

3. The method for obtaining an AOD according to claim 1, wherein transmitting the plurality of sweeping beams to the reception terminal comprises:

periodically transmitting the plurality of sweeping beams to the reception terminal according to an angle measurement period.

4. The method for obtaining an AOD according to claim 1, wherein transmitting the plurality of sweeping beams to the reception terminal comprises:

performing a plurality of rounds of beam sweeping, and transmitting, after each round of beam sweeping is completed, a plurality of sweeping beams swept in the round to the reception terminal;

performing the plurality of rounds of beam sweeping comprises:

performing beam sweeping according to a number of sweeping rounds negotiated with the reception terminal; or, transmitting indication information to the reception terminal after each round of sweeping is completed or beam identifier is received, wherein the indication information is configured to indicate whether a sweeping beam in a next round is present; and the indication information further comprises start time of a next round of sweeping.

5. The method for obtaining an AOD according to claim 4, wherein the beam identifier is a beam identifier corresponding to a sweeping beam having optimal signal quality in the sweeping beams swept in each round, and performing the plurality of rounds of beam sweeping comprises:

determining a first beam azimuth angle of a sweeping beam in a next round according to a beam identifier received in a last round and a current round number; and performing a next round of beam sweeping according to the first beam azimuth angle.

6. The method for obtaining an AOD according to claim 4, further comprising:

determining a second beam azimuth angle of the sweeping beam according to the sweeping beam identified by the beam identifier and a current round number; and dividing the second beam azimuth angle according to a number of beams to be swept in each round, and determining a first beam azimuth angle of a next round.

7. The method for obtaining an AOD according to claim 1, wherein a beam identifier of each sweeping beam is determined according to a corresponding transmission position of the sweeping beam, or, each sweeping beam carries its own beam identifier.

8. The method for obtaining an AOD according to claim 1, further comprising:

receiving a measurement result of the sweeping beam, wherein the measurement result comprises at least one of:

reference signal receiving power (RSRP); or, reference signal receiving quality (RSRQ).

9. The method for obtaining an AOD according to claim 1, wherein before transmitting the plurality of sweeping beams to the reception terminal, the method further comprises:

negotiating an angle measurement parameter of the AOD with the reception terminal in one of the following ways:

transmitting an angle measurement inquiry to the reception terminal, wherein the angle measurement inquiry carries the angle measurement parameter;

receiving an angle measurement inquiry response transmitted from the reception terminal, wherein the angle measurement inquiry response carries the angle measurement parameter;

transmitting resource scheduling information to the reception terminal, wherein the resource scheduling information comprises the angle measurement parameter; or transmitting negotiation indication information to the reception terminal, wherein the negotiation indication information carries the angle measurement parameter;

wherein the angle measurement parameter comprises one or more of the following parameters:

a number of sweeping beams transmitted, a sweeping interval, a number of beam identifiers fed back, a number of sweeping rounds, a sweeping interval of each round, a number of sweeping beams swept in each round, time frequency resource information used by the sweeping beams, or an angle measurement period for triggering angle measurement.

10. The method for obtaining an AOD according to claim 1, wherein the capability negotiation inquiry is transmitted or the capability negotiation inquiry response is received through a user equipment capability inquiry sidelink or a user equipment capability information sidelink.

11. A method for obtaining an angle of departure (AOD), comprising:

receiving a plurality of sweeping beams transmitted from a transmission terminal;

measuring signal quality of each sweeping beam; and transmitting at least one beam identifier to the transmission terminal according to the signal quality of the plurality of sweeping beams, wherein an AOD of the transmission terminal is equal to a beam azimuth angle of a target sweeping beam determined based on the at least one beam identifier;

wherein the method further comprises:

receiving a capability negotiation inquiry transmitted from the transmission terminal, wherein the capability negotiation inquiry is configured to negotiate whether a reception terminal supports AOD angle measurement based on beams; and transmitting a capability negotiation inquiry response to the transmission terminal, wherein the negotiation inquiry response is configured to indicate whether the reception terminal supports the AOD angle measurement based on beams.

12. The method for obtaining an AOD according to claim 11, wherein the at least one beam identifier is at least one beam identifier selected in a descending order of the signal quality of the plurality of sweeping beams.

13. The method for obtaining an AOD according to claim 11, wherein receiving the plurality of sweeping beams transmitted from the transmission terminal comprises:

receiving, according to an angle measurement period, the plurality of sweeping beams periodically transmitted from the transmission terminal.

14. The method for obtaining an AOD according to claim 11, wherein receiving the plurality of sweeping beams transmitted from the transmission terminal comprises:

receiving, after each of a plurality of rounds of beam sweeping performed by the transmission terminal is completed, a plurality of sweeping beams, swept in the round, transmitted from the transmission terminal; wherein receiving, after each of the plurality of rounds of beam sweeping performed by the transmission terminal is completed, the plurality of sweeping beams, swept in the round, transmitted from the transmission terminal comprises:

receiving the plurality of sweeping beams, swept in the round, transmitted from the transmission terminal according to a number of sweeping rounds negotiated with the transmission terminal; or, receiving indication information transmitted from the transmission terminal, wherein the indication information is configured to indicate whether a sweeping beam in a next round is present; and the indication information is transmitted from the transmission terminal after each round of sweeping is completed or a beam identifier is received; and receiving, in response to the indication information that the sweeping beam in the next round is present, the plurality of sweeping beams transmitted from the transmission terminal after a next round of sweeping; wherein the indication information further comprises start time of the next round of sweeping, and the beam identifier is a beam identifier corresponding to a sweeping beam having optimal signal quality in the sweeping beams swept in each round.

15. The method for obtaining an AOD according to claim 11, further comprising:

determining a beam identifier of the sweeping beam according to a transmission position of the sweeping beam; or, extracting the beam identifier of the sweeping beam from the sweeping beam.

16. The method for obtaining an AOD according to claim 11, further comprising:

transmitting a measurement result of the sweeping beam to the transmission terminal, wherein the measurement result comprises at least one of:

reference signal receiving power (RSRP); or, reference signal receiving quality (RSRQ).

17. The method for obtaining an AOD according to claim 11, wherein before receiving the plurality of sweeping beams transmitted from the transmission terminal, the method further comprises:

negotiating an angle measurement parameter of the AOD with the transmission terminal in one of the following ways:

receiving an angle measurement inquiry transmitted from the transmission terminal, wherein the angle measurement inquiry carries the angle measurement parameter;

transmitting an angle measurement inquiry response to the transmission terminal, wherein the angle measurement inquiry response carries the angle measurement parameter;

receiving resource scheduling information transmitted from the transmission terminal, wherein the resource scheduling information comprises the angle measurement parameter; or, receiving negotiation indication information transmitted from the transmission terminal, wherein the negotiation indication information carries the angle measurement parameter;

wherein the angle measurement parameter comprises one or more of the following parameters:

a number of sweeping beams transmitted, a sweeping interval, a number of beam identifiers fed back, a number of sweeping rounds, a sweeping interval of each round, a number of sweeping beams swept in each round, time frequency resource information used by the sweeping beams, and the angle measurement period for triggering angle measurement.

18. The method for obtaining an AOD according to claim 11, wherein the capability negotiation inquiry is received or the capability negotiation inquiry response is transmitted through a user equipment capability inquiry sidelink or a user equipment capability information sidelink.

19. A communication device, comprising:

at least one processor; and a memory communicatively connected to the at least one processor, wherein the memory stores an instruction executable by the at least one processor, and the instruction, when executed by the at least one processor, causes the at least one processor to execute the method according to claim 11.

20. A communication device, comprising:

at least one processor; and a memory communicatively connected to the at least one processor, wherein the memory stores an instruction executable by the at least one processor, and the instruction, when executed by the at least one processor, causes the communication device:

transmit a plurality of sweeping beams to a reception terminal;

receive at least one beam identifier, wherein the at least one beam identifier is determined according to signal quality of the plurality of sweeping beams; and determine a target sweeping beam based on the at least one beam identifier, and determining an angle of departure (AOD) of a transmission terminal based on the target sweeping beam, wherein the AOD of the transmission terminal is equal to a beam azimuth angle of the target sweeping beam;

wherein the instruction, when executed by the at least one processor, further causes the communication device to:

transmit a capability negotiation inquiry to the reception terminal, wherein the capability negotiation inquiry is configured to negotiate whether the reception terminal supports AOD angle measurement based on beams; and receive a capability negotiation inquiry response transmitted from the reception terminal, wherein the negotiation inquiry response is configured to indicate whether the reception terminal supports the AOD angle measurement based on beams.

* * * * *